US007065018B2

(12) United States Patent
Watt et al.

(10) Patent No.: US 7,065,018 B2
(45) Date of Patent: Jun. 20, 2006

(54) CLV SYSTEM AND METHOD USING PSA LOOKUP

(75) Inventors: Charles R. Watt, Longmont, CO (US); Christopher J. Turner, Niwot, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 787 days.

(21) Appl. No.: 09/951,108

(22) Filed: Sep. 10, 2001

(65) Prior Publication Data

US 2002/0097646 A1     Jul. 25, 2002

Related U.S. Application Data

(60) Provisional application No. 60/264,351, filed on Jan. 25, 2001.

(51) Int. Cl.
*G11B 5/09* (2006.01)
(52) U.S. Cl. .............. 369/47.4; 369/47.36; 369/47.38; 369/47.39; 369/47.45; 369/44.27; 369/53.3
(58) Field of Classification Search .............. 369/47.4, 369/47.45, 47.43, 47.21, 47.55, 47.53, 30.04, 369/44.36, 275.3, 275.4, 47.38, 47.36, 47.39, 369/44.27, 53.1, 53.3, 59.1, 124.14, 124.15; 360/48, 73.03, 60, 30.13
See application file for complete search history.

(56) References Cited

U.S. PATENT DOCUMENTS

| | | | | |
|---|---|---|---|---|
| 4,750,059 A | * | 6/1988 | Syracuse | 360/48 |
| 5,060,219 A | * | 10/1991 | Lokhoff et al. | 369/47.21 |
| 5,063,550 A | * | 11/1991 | Watari et al. | 369/44.36 |
| 5,301,172 A | * | 4/1994 | Richards et al. | 369/30.04 |
| 5,568,467 A | * | 10/1996 | Inagaki et al. | 369/47.43 |
| 5,726,958 A | * | 3/1998 | Min | 369/30.13 |
| 5,870,363 A | * | 2/1999 | Sun et al. | 369/47.45 |
| 6,298,033 B1 | * | 10/2001 | Tanoue et al. | 369/275.3 |
| 6,404,711 B1 | * | 6/2002 | Kato | 369/47.31 |

OTHER PUBLICATIONS

"Method for Smartly Controlling The Optical Disk Drive", Publication No. 342,492, Taiwan Patent Gazette, Nov. 11, 1998, pp. 1067-1078, X06 (2 pp.) and Abstract in English (1 p.).

* cited by examiner

*Primary Examiner*—William Korzuch
*Assistant Examiner*—Kim-Kwok Chu
(74) *Attorney, Agent, or Firm*—Jonathan W. Hallman; MacPherson Kwok Chen & Heid

(57) ABSTRACT

A system and method for controlling operation of a motor system that addresses the design challenges for the small form factor optical disk system. The control system can be operable to read a physical sector address (PSA) from an optical medium, calculate a table index based on the PSA, enter a lookup table module to acquire reference data, and maintain a constant data rate transfer from the optical medium for a range of PSAs.

17 Claims, 10 Drawing Sheets

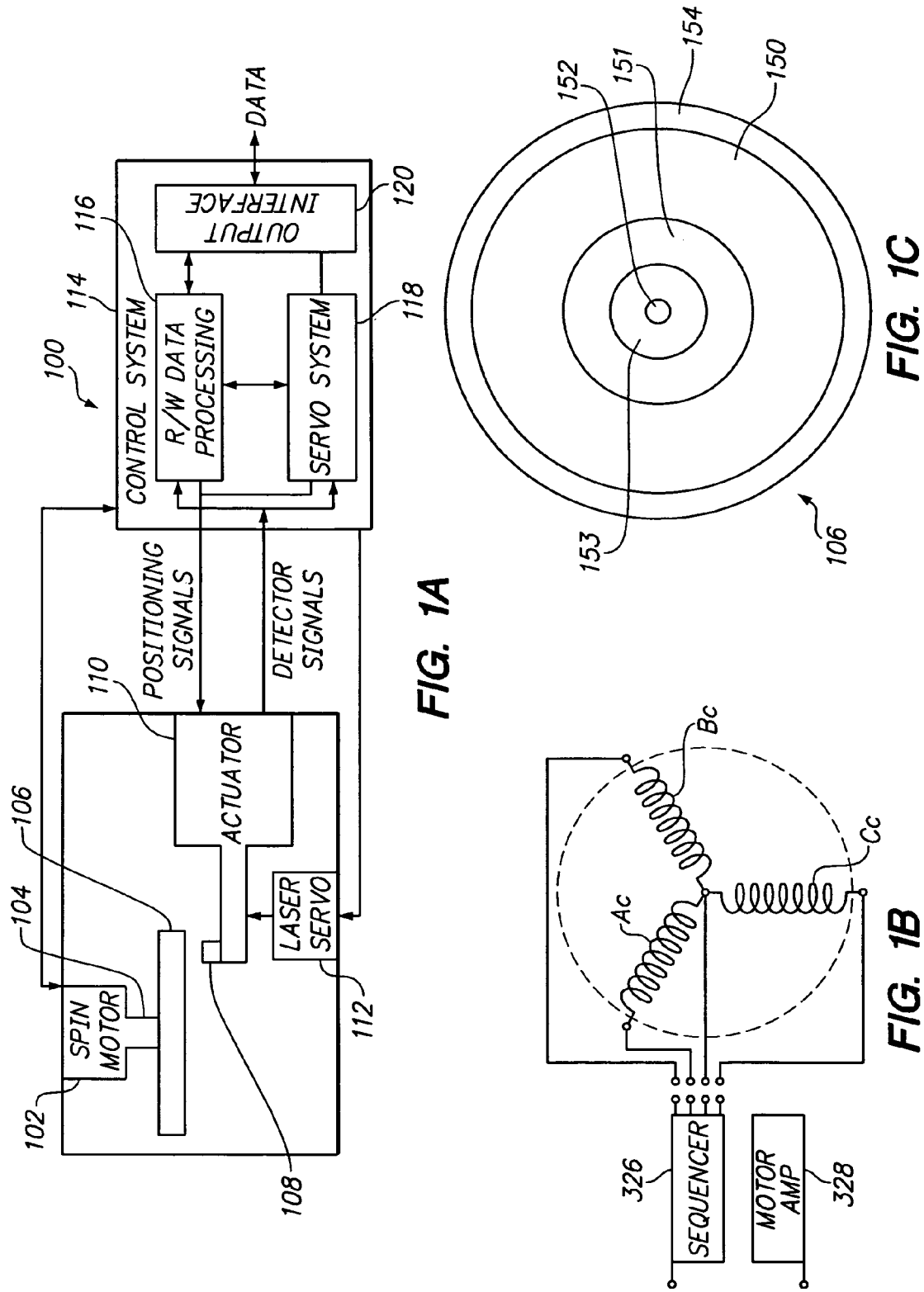

CLV SYSTEM AND METHOD USING PSA LOOKUP

This application claims the benefit and priority of U.S. Provisional Application 60/264,351, filed Jan., 25, 2001, which is herein incorporated by reference for all purposes.

CROSS-REFERENCE TO CD-ROM APPENDIX

CD-ROM Appendix A, which is a part of the present disclosure, is a CD-ROM appendix consisting of 22 text files. CD-ROM Appendix A includes a software program executable on a controller as described below. The total number of compact disks including duplicates is two. Appendix B, which is part of the present specification, contains a list of the files contained on the compact disk. The attached CD-ROM Appendix A is formatted for an IBM-PC operating a Windows operating system.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

These and other embodiments are further discussed below.

BACKGROUND

1. Field of the Invention

The present invention relates to an optical disk system and, in particular, to a servo system for controlling and monitoring the operation of an optical disk spin motor control system.

2. Related Art

The need for compact data storage is explosively increasing. The explosive increase in demand is fueled by the growth of multimedia systems utilizing text, video, and audio information. Furthermore, there is a large demand for highly portable, rugged, and robust systems for use as multimedia entertainment, storage systems for PDAs, cell phones, electronic books, and other systems. One of the more promising technologies for rugged, removable, and portable data storage is WORM (write once read many) optical disk drives.

One of the important factors affecting design of an optical system (such as that used in a WORM drive) is the optical components used in the system and the control of actuators used to control the optical system on the disk. The optical system typically includes a laser or other optical source, focusing lenses, reflectors, optical detectors, and other components. Although a wide variety of systems have been used or proposed, typical previous systems have used optical components that were sufficiently large and/or massive that functions such as focus and/or tracking were performed by moving components of the optical system. For example, some systems move the objective lens (e.g. for focus) relative to the laser or other light source. It was generally believed that the relatively large size of the optical components was related to the spot size, which in turn was substantially dictated by designs in which the data layer of a disk was significantly spaced from the physical surface of the disk. A typical optical path, then, passed through a disk substrate, or some other portion of the disk, typically passing through a substantial distance of the disk thickness, such as about 0.6 mm or more, before reaching a data layer.

Regardless of the cause being providing for relative movement between optical components, such an approach, while perhaps useful for accommodating relatively large or massive components, presents certain disadvantages for more compact usage. These disadvantages include a requirement for large form factors, the cost associated with establishing and maintaining optical alignment between components which must be made moveable with respect to one another, and the power required to perform operations on more massive drive components. Such alignment often involves manual and/or individual alignment or adjustment procedures which can undesirably increase manufacturing or fabrication costs for a reader/writer, as well as contributing to costs of design, maintenance, repair and the like.

Many early optical disks and other optical storage systems provided relatively large format read/write devices including, for example, devices for use in connection with 12 inch (or larger) diameter disks. As optical storage technologies have developed, however, there has been increasing attention toward providing feasible and practical systems which are of relatively smaller size. Generally, a practical read/write device must accommodate numerous items within its form factor, including the media, media cartridge (if any), media spin motor, power supply and/or conditioning, signal processing, focus, tracking or other servo electronics, and components associated or affecting the laser or light beam optics. Accordingly, in order to facilitate a relatively small form-factor, an optical head occupying small volume is desirable. In particular, it is desirable that the optical head have a small dimension in the direction perpendicular to the surface of the spinning media. Additionally, a smaller, more compact, optical head provides numerous specific problems for electronics designed to control the position and focus of the optical head.

Additionally, although larger home systems have little concern regarding power usage, portable personal systems should be low power devices. Therefore, it is important to have a system that conserves power (e.g., by optically overfilling lenses) in both the optical system and the electronic controlling system.

SUMMARY

In accordance with the present invention, a system and method includes a control system design for controlling operation of a motor system that addresses the design challenges for the small form factor optical disk system. The optical disk system includes a spin motor on which an optical medium is positioned, an optical pick-up unit positioned relative to the optical medium, an actuator arm that controls the position of the optical pick-up unit, and a control system for controlling the spin motor, the actuator arm, and the laser.

Embodiments of the control system and device in accordance with the present invention use several unique methods including sharing a general purpose processor between the servo system and other drive systems in the device, using a dedicated high speed processor for time critical servo functions, communicating between the dedicated servo processor and the shared general purpose processor, distributing the servo processing between the general purpose processor and the dedicated servo processor, and distributing the servo processing within the general purpose processor between a main loop process and a background periodic interrupt process.

In one aspect of the present invention, a method is provided for controlling the spin speed of a motor. The method includes receiving a physical sector address (PSA) value and recording a current time of receipt; entering a database using a table index based on the PSA value; and providing reference data from the database corresponding to the table index to provide an output for providing a control effort.

In another aspect of the present invention, a method is provided for controlling the spin velocity of an optical medium. The method includes reading a physical sector address (PSA) from an optical medium; calculating a table index based on the PSA; entering a lookup table module to acquire reference data; and maintaining a constant data rate transfer from the optical medium for a range of PSAs.

In another aspect of the present invention, a system is provided for controlling spin velocity of an optical medium. The system includes a means for reading a physical sector address (PSA) from an optical medium; means for calculating a table index based on the PSA; means for entering a lookup table module to acquire reference data; and means for maintaining a constant data rate transfer from the optical medium for a range of PSAs.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 1A shows an optical drive according to the present invention.

FIG. 1B is a simplified schematic illustration of a motor in accordance with the present invention.

FIG. 1C shows an example of an optical media that can be used with an optical drive according to the present invention.

Figure 2A:
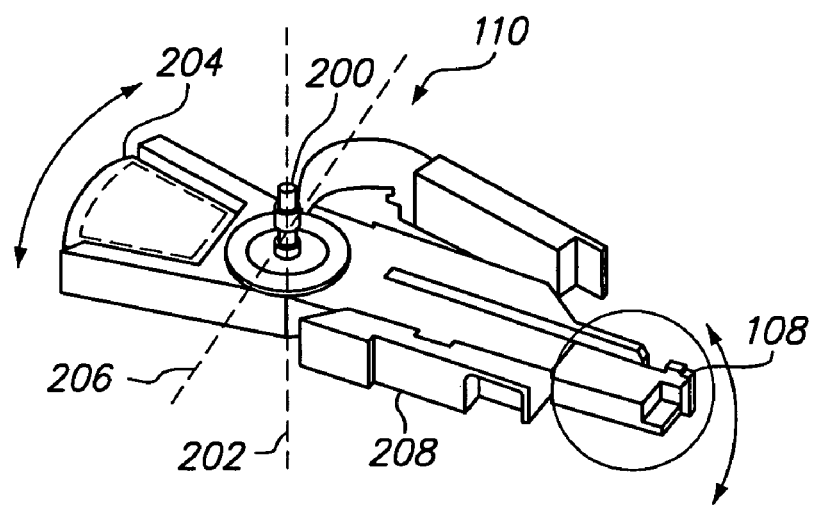
FIG. 2A shows an embodiment of an optical pickup unit mounted on an actuator arm according to the present invention.

Uses, advantages, and variations of the present invention will be apparent to one of ordinary skill in the art upon reading this disclosure and accompanying drawings.

DETAILED DESCRIPTION

The present disclosure was co-filed with the following sets of disclosures: the "Tracking and Focus Servo System" disclosures, the "Servo System Calibration" disclosures, the "Spin Motor Servo System" disclosures, and the "System Architecture" disclosures; each of which was filed on the same date and assigned to the same assignee as the present disclosure, and are incorporated by reference herein in their entirety. The Tracking and Focus Servo System disclosures include U.S. Disclosure Ser. Nos. 09/950,329, 09/950,365, 09/950,408, 09/950,444, 09/950,394, 09/950,413, 09/9501347, 09/950,914, 09/950,410, 09/950,441, 09/950, 373, 09/950,425, 09/950,414, 09/950,378, 09/950,513, 09/950,331, 09/950,395, 09/950,376, 09/950,393, 09/950, 432, 09/950,379, 09/950,515, 09/950,411, 09/950,412, 09/950,361, and 09/950,540. The Servo System Calibration disclosures include U.S. Disclosure Ser. Nos. 09/950,398, 09/950,396, 09/950,360, 09/950,372, 09/950,541, 09/950, 409, 09/950,520, 09/950,377, 09/950,367, 09/950,512, 09/950,415, 09/950,548, 09/950,392, and 09/950,514. The Spin Motor Servo System disclosures include U.S. Disclosure Ser. Nos. 09/951,869, 09/951,330, 09/951,930, 09/951, 328, 09/951,325 and 09/951,475. The System Architecture disclosures include U.S. Disclosure Ser. Nos. 09/951,947, 09/951,340, 09/951,339, 09/951,469, 09/951,337, 09/951, 329, 09/951,332, 09/951,931, 09/951,850, 09/951,333, 09/951,331, 09/951,156, 09/951,340 and 09/951,940.

The present disclosure was also co-filed with the following disclosures U.S. Patent Disclosure Ser. Nos. 09/950,516, and 09/950,365,, each of which was filed on the same date and assigned to the same assignee as the present disclosure, and are incorporated by reference herein in their entirety.

The detailed description that follows is presented largely in terms of processes and representations of operations, which can be performed by servo systems and the like to control and command various devices. The servo systems may advantageously contain program logic or other substrate configuration representing data and instructions, which cause the servo system to operate in a specific and predefined manner, as described herein. The program logic may advantageously be implemented as one or more modules. The modules may advantageously be configured to reside on memory in processors and execute on the one or more processors. The modules include, but are not limited to, software, firmware, hardware or a combination thereof that perform certain tasks. Thus, a module may include, by way of example, software components, processes, functions, subroutines, procedures, attributes, class components, task components, object-oriented software components, segments of program code, drivers, firmware algorithms, microcode, circuitry, data, and the like.

The program logic is generally considered to be a sequence of processor-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those of ordinary skill in the art to refer to these signals as bits, values, elements, symbols, characters, text, terms, numbers, records, files, and the like. It should be kept in mind, however, that these and some other terms should be associated with appropriate physical quantities for processor operations, and that these terms are merely conventional labels applied to physical quantities that exist within and during operations.

It should be understood that manipulations within the processor are often referred to in terms of adding, processing, comparing, retrieving, playing, moving, searching, transmitting, receiving, and the like, which are often associated with manual operations performed by a human operator. It is to be understood that no involvement of the human operator may be necessary, or even desirable. The operations described herein are machine operations performed in conjunction with the human operator or user that interacts with the devices in which the servo systems are resident.

It should also be understood that the programs, modules, processes, algorithms, routines, methods, and the like, described herein are but an exemplary implementation and are not related, or limited, to any particular computer, processor, apparatus, or computer language. Rather, various types of general purpose computing machines or devices may be used with programs constructed in accordance with the teachings described herein. Similarly, it may prove advantageous to construct a specialized apparatus to perform the processes described herein by way of a dedicated system with hard-wired logic or programs stored in non-volatile memory, such as read-only memory (ROM).

Throughout this description, the embodiments and examples shown should be considered as exemplars, rather than limitations on the present invention. It should be understood that although many of the embodiments of processes are shown as subroutines to other processes, these subroutines may perform as stand alone routines.

In accordance with the present invention, an optical disk system is presented. The optical disk system includes a spin motor on which an optical media is positioned, an optical pick-up unit positioned relative to the optical media, an actuator arm that controls the position of the optical pick-up unit, and a control system for controlling the spin motor, the actuator arm, and the laser. The control system can include a read/write channel coupled to provide control signals to a servo system.

The optical media can be a relatively small-sized disk with readable data present on the surface of the disk. Furthermore, the optical disk may have a pre-mastered portion and a writeable portion. The pre-mastered portion is formed when the disk is manufactured and contains readable data such as, for example, audio, video, text or any other data that a content provider may wish to include on the disk. The writeable portion is left blank and can be written by the disk drive to contain user information (e.g., user notes, interactive status (for example in video games), or other information that the drive or user may write to the disk). Because there may be optical differences, for example in reflectivity, and in the data storage and addressing protocols between the pre-mastered portion of the disk and the writeable portion of the disk, a control system according to the present invention may have different operating parameters in the different areas of the disk.

The optical pick-up unit includes a light source, reflectors, lenses, and detectors for directing light onto the optical media. The detectors include laser power feed-back detectors as well as data detectors for reading data from the optical media. The optical pick-up unit is mechanically mounted on the actuator arm. The actuator arm includes a tracking actuator for controlling lateral movement across the optical media and a focus actuator for controlling the position of the optical pick-up unit above the optical medium. The tracking and focus actuators of the optical pick-up unit are controlled by the controller.

In some embodiments, for example, the focus actuator is a voice coil positioned to flex the actuator arm at a flexure line so that the optical pick-up unit moves in a direction perpendicular to the surface of the optical media. The tracking actuator can include a voice coil positioned so that the actuator arm can be rotated around a point on the actuator arm so that the optical pick-up unit can be positioned on tracks across the optical medium.

The controller can further include control electronics for controlling the power to the laser. In some embodiments, the laser power may be adjusted to a high level in order to write data to the optical data and adjusted to a low level in order to read data from the optical media.

The servo system includes various feedback loops for controlling the operation of the spin motor, the optical pick-up unit, and the controller. The feedback loops, for example, can include a tracking loop, a focus loop, a spindle speed control loop, and a laser power control loop. Furthermore, servo system according to the present invention operate even in the event of significant cross-talk between the individual feedback loops. Furthermore, a servo system according to the present invention can include track seeking (both multi-track seeking and one-track seeking), error recovery, and other functions related to the control of the optical pick-up unit, focus positioning and tracking positioning, during transfer of data to and from the optical media during read and write operations, respectively. In some embodiments of the present invention, a servo system can include calibration routines, which set and define operating parameters of the servo system. In some embodiments, calibrations can be adaptively accomplished during operation of the disk drive. In some embodiments, calibrations are accomplished whenever a new optical disk is inserted into the optical drive.

FIG. 1A shows an optical drive 100 according to the present invention. Optical drive 100 includes a spin motor 102, which rotates a rotor shaft 104 on which an optical medium 106 can be mounted. Optical drive 100 further includes an optical pick-up unit (OPU) 108 mechanically controlled by an actuator arm 110. OPU 108 includes a light source electrically controlled by laser driver 112. OPU 108 further includes optical detectors providing signals for control system 114. Control system 114 can control the rotational speed of optical medium 106 by controlling spin motor 102, can control the position and orientation of OPU 108 through actuator arm 110, and can control the optical power of the light source in OPU 108 by controlling laser driver 112.

Control system 114 includes R/W processing 116, servo system 118, and output interface 120. Read/Write processing 116 controls the reading of data from optical medium 106 and the writing of data to optical medium 106. Read/Write processing 116 outputs data to a host (not shown) through output interface 120. Servo system 118 controls the speed of spin motor 102, the position of OPU 108, and the laser power in response to signals from R/W processing 116. Further, servo system 118 insures that the operating parameters (e.g., focus, tracking, and spin motor speed) are controlled in order that data can be read from or written to optical medium 106.

FIG. 1C shows an example of optical medium 106. Optical medium 106 can include any combinations of premastered portions 150 and writeable portions 151. Premastered portions 150, for example, can be written at the time of manufacture to include content provided by a content provider. The content, for example, can include audio data, video data, text data, or any other data that can be provided with optical medium 106. Writeable portion 151 of optical medium 106 can be written onto by optical drive 100 to provide data for future utilization of optical medium 106. The user, for example, may write notes, keep interactive status (e.g., for games or interactive books) or other information on the disk. Optical drive 100, for example, may write calibration data or other operating data to the disk for future operations of optical drive 100 with optical medium 106. In some embodiments, optical medium 106 includes an inner region 153 close to spindle access 152. A bar code can be written on a portion of an inner region 153. The readable portion of optical medium 106 starts at the boundary of region 151 in FIG. 1C. In some embodiments, writeable portion 151 may be at the outer diameter rather than the inner diameter. In some embodiments of optical medium 106, a portion of the disk can be reserved as read only memory (ROM), that provides information about optical medium 106, such as the type of media being used and the boundaries for the various regions. The ROM portion may be referred to as the Data System Area (DSA). In some embodiments of optical medium 106, an unusable outer region 154 can also be included.

An example of optical medium 106 is described in U.S. application Ser. No. 09/560,781, filed Apr. 28, 2000, which is herein incorporated by reference in its entirety. The R/W Data Processing 116 can operate with many different disk formats. One example of a disk format is provided in U.S. application Ser. No. 09/527,982, filed Mar. 17, 2000, which is herein incorporated by reference in its entirety. Other examples of disk data formats are provided in U.S. application Ser. No. 09/539,841, filed Mar. 31, 2000, U.S. application Ser. No. 09/583, 448, filed May 30, 2000, U.S. application Ser. No. 09/542,681, filed Apr. 3, 2000, U.S. application Ser. No. 09/542,510, filed Apr. 3, 2000, U.S. application Ser. No. 09/583,133, filed May 30, 2000, and U.S. application Ser. No. 09/583,452, filed May 30, 2000, each of which is herein incorporated by reference in its entirety.

Optical drive 100 can be included in any host, for example personal electronic devices. Examples of hosts that may include optical drive 100 are further described in U.S. patent application Ser. No. 09/315,398, filed May 20, 1999, which is herein incorporated by reference in its entirety. In some embodiments, optical drive 100 can have a relatively small form factor such as about 10.5 mm height, 50 mm width and 40 mm depth.

FIG. 2A shows an embodiment of actuator arm 110 with OPU 108 mounted on one end. Actuator arm 110 in FIG. 2A includes a spindle 200, which provides a rotational pivot about axis 202 for actuator arm 110. Actuator coil 204, which in some embodiments can be a magnetic coil positioned over a permanent magnet, can be provided with a current to provide a rotational motion about axis 202. Actuator arm 110 further includes a flex axis 206. A motion of OPU 108 substantially perpendicular to the rotational motion about axis 206 can be provided by activating actuator coil 208. In some embodiments, actuator coils 204 and 208 can be voice coils.

Figure 2B:
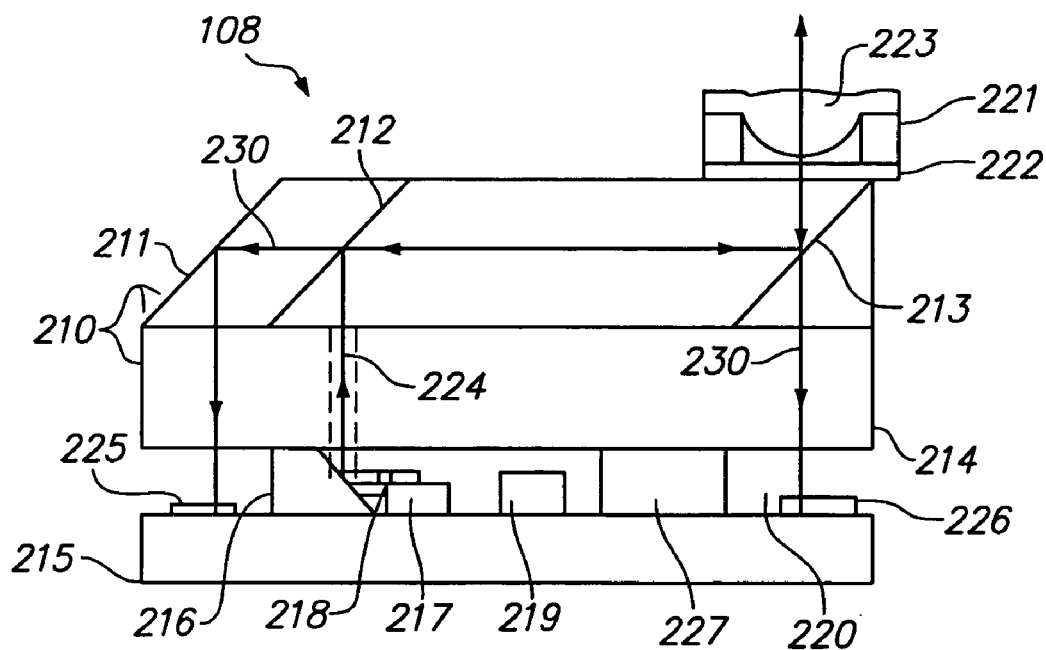
FIG. 2B shows an embodiment of an optical pick-up unit according to the present invention.
Figure 2C:
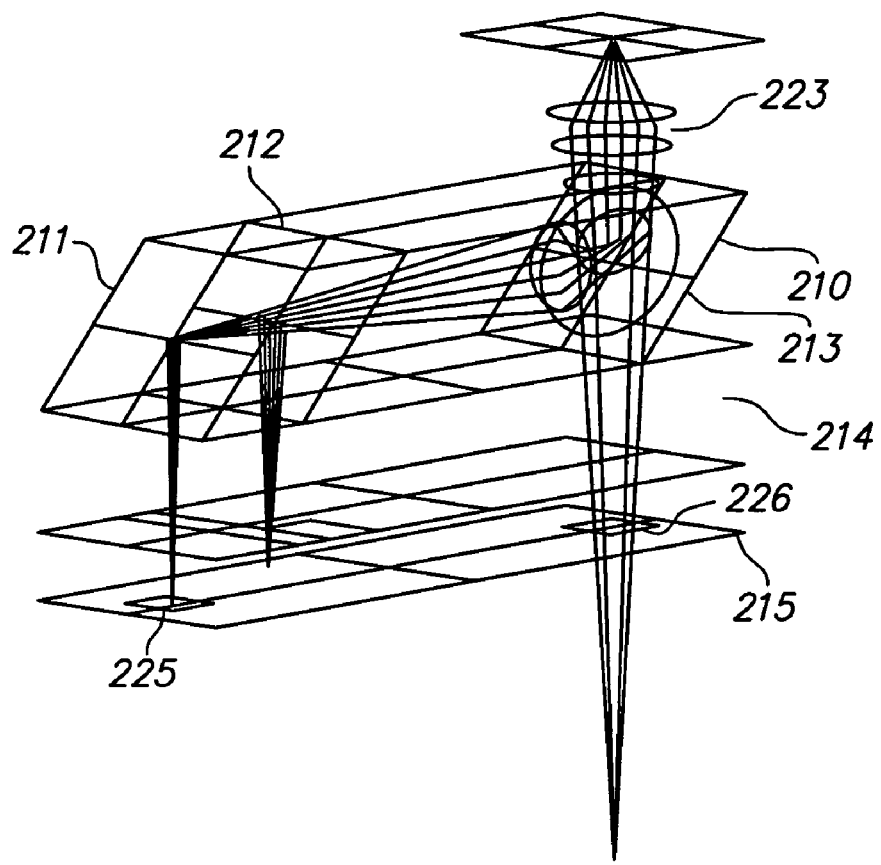
FIG. 2C illustrates the optical path through the optical head of FIG. 2B.

FIGS. 2B and 2C show an embodiment of OPU 108. OPU 108 of FIG. 2B includes a periscope 210 having reflecting surfaces 211, 212, and 213. Periscope 210 is mounted on a transparent optical block 214. Object lens 223 is positioned on spacers 221 and mounted onto quarter wave plate (QWP) 222 which is mounted on periscope 210. Transparent optical block 214is, in turn, mounted onto turning mirror 216 and spacer 224, which are mounted on a silicon submount 215. A laser 218 is mounted on a laser mount 217 and positioned on silicon submount 215. Further, detectors 225 and 226 are positioned and mounted on silicon substrate 215. In some embodiments, a high frequency oscillator (HFO) 219 can be mounted next to laser 218 on silicon submount 215 to provide modulation for the laser beam output of laser 218.

Laser 218 produces an optical beam 224 which is reflected into transparent block 214 by turning mirror 216. Beam 224 is then reflected by reflection surfaces 212 and 213 into lens 223 and onto optical medium 106 (FIG. 1A). In some embodiments, reflection surfaces 212 and 213 can be polarization dependent and can be tuned to reflect substantially all of the light from laser 218. QWP 222 rotates the polarization of laser beam 224.

The reflected beam 230 from optical medium 106 is collected by lens 223 and focused into periscope 210. A portion (in some embodiments about 50%) of reflected beam 230 passes through reflecting surface 213 and is directed onto optical detector 226. Further, a portion of reflected beam 230 passes through reflecting surface 212 and is reflected onto detector 225 by reflecting surface 211. Because of the difference in path distances between the positions of detectors 225 and 226, detector 226 is positioned before the focal point of lens 223 and detector 225 is positioned after the focal point of lens 223, as is shown in the optical ray diagram of FIG. 2C.

Figure 2D:
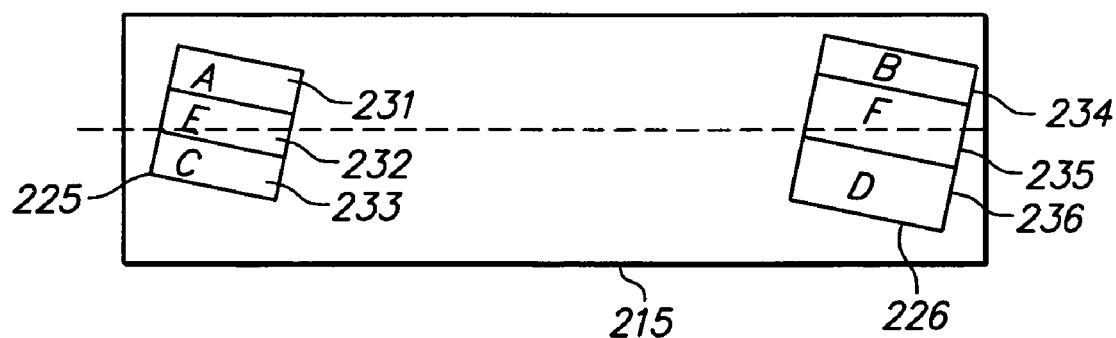
FIG. 2D shows an embodiment of optical detector positioning of the optical pick-up of FIG. 2B.

FIG. 2D shows an embodiment of detectors 225 and 226 according to the present invention. Detector 225 includes an array of optical detectors 231, 232, and 233 positioned on submount 215. Each individual detector, detectors 231, 232, and 233, is electrically coupled to provide signals A, E and C to control system 114 (FIG. 1A). Detector 226 also includes an array of detectors, detectors 234, 235 and 236, which provide signals B, F, and D, respectively, to control system 114. In some embodiments, center detectors 232 and 235, providing signals E and F, respectively, are arranged to approximately optically align with the tracks of optical medium 106 (FIG. 1A) as actuator arm 110 (FIG. 1A) is rotated across optical medium 106.

The degree of focus, then, can be determined by measuring the difference between the sum of signals A and C and the center signal E of detector 225 and the difference between the sum of signals B and D and the center signal F of detector 226. A tracking monitor can be provided by monitoring the difference between signals A and C of detector 225 and the difference between signals B and D of detector 226. Representative embodiments of OPU 108 are further described in application Ser. No. 09/540,657, filed Mar. 31, 2000, which is herein incorporated by reference in its entirety.

Referring now to FIG. 1B, a schematic representation of spin motor 102 of optical drive 100 is shown, which can be one of many well-known types of spin motors suitable for use with the present invention. In one embodiment, spin motor 102 can be a three-phase, brushless spin motor connected to the associated control and drive circuitry as described herein. In a particular example illustrated herein, spin motor 102 is a twelve-pole motor having nine windings, which indicates that the motor magnet has six pairs of N/S magnet poles (i.e. twelve pole motor) and includes 9 stator slots on which the coils are wound. The nine windings are grouped into three coils $A_c$, $B_c$, and $C_c$, where each winding set is selectively driven at a predetermined phase. (Note: The terms coil and winding are sometimes used interchangeably herein). As known to those of ordinary skill in the art, a sequencer 326 and a motor amplifier 328 collectively, can operate to selectively drive the phase windings to induce rotation of rotor shaft 104 of spin motor 102.

Spin motor 102 includes rotor shaft 104, which rotates responsive to the magnetic fields generated by the current flowing through coils $A_c$, $B_c$, and $C_c$ being energized in a standard sequence, such as in bipolar operation. In one embodiment, the rotor of spin motor 102 has a segmented magnet which in conjunction with the stator coils generates a rotational force proportional to the current in coils $A_c$, $B_c$, and $C_c$. To cause rotation, motor sequencer 326 applies a current to the coils in a specific sequence, which is synchronized with the rotor position. In bipolar operation, sequencer 326 controls spin motor 102, such that current is driven through two coils while a third coil is left floating. As described in greater detail below, the back electromotive force (BEMF) of the floating coil can generate a zero crossing interrupt, which may be used to indicate the rotational velocity of rotor shaft 104 relative to coils $A_c$, $B_c$ and $C_c$. This zero crossing interrupt is also used by sequencer 326 to switch the current into the proper coils to generate a continuous rotational force. If rotor shaft 104 is rotating too fast, a signal can be provided to sequencer 326, which lowers the current to the coils to slow down rotor shaft 104. Conversely, if rotor shaft 104 is rotating too slowly, a signal can be provided to sequencer 326, which increases the current to the coils to speed up rotor shaft 104.

Referring again to FIG. 1A, optical drive 100 presents a multitude of challenges in control over conventional optical disk drive systems. A conventional optical disk drive system, for example, may perform a two-stage tracking operation by moving the optics and focusing lens radially across the disk on a track and may perform a focusing operation by moving a focusing lens relative to a disk. Typically, conventional optical disk drive systems are much larger than some embodiments of optical drive 100. Some major differences include the actuator positioning of actuator arm 110, which operates in a rotary fashion around spindle 200 (FIG. 2A) for tracking and with a flexure action around axis 206 for focus. Further, the speed of rotation of spin motor 102 is dependent on the track position of actuator arm 110. Additionally, the characteristics of signals A, B, C, D, E, and F received from OPU 108 differ with respect to whether OPU 108 is positioned over a pre-mastered portion of optical medium 106 or a writable portion of optical medium 106. Finally, signals A, B, C, D, E, and F differ between a read operation and a write operation.

It may generally be expected that moving to a lightweight structural design such as actuator arm 110 may lessen problems involving structural resonance. Typically, mechanical resonance scales with size, such that the resonant frequency increases as the size decreases. Further, focus actuation and tracking actuation in actuator arm 110 are more strongly coupled in actuator arm 110 where in conventional designs the actuator and tracking actuation is more orthogonal and decoupled. Further, since all of the optics in optical drive 100 are concentrated at OPU 108, a larger amount of optical cross-coupling between tracking and focus measurements is experienced. In accordance with the present invention, servo system 118 pushes the bandwidth of the servo system as hard as possible, but not so hard that mechanical resonance in actuator arm 110 are excited, to avoid erroneously responding to mechanical and optical cross couplings.

The major challenges faced by servo system 118 of control system 114 can include operating at lower bandwidth with large amounts of cross coupling and nonlinear system responses from operating closer to the bandwidth. Additionally, the performance of optical drive 100 should match or exceed that of conventional CD or DVD drives in terms of track densities and data densities.

Most conventional optical drive servo systems are analog servos. In an analog environment, the optical drive servo system operates with the constraints of the analog calculations. In accordance with the present invention, control system 114, however, includes substantially a digital servo system. A digital servo system, such as servo system 118, has a higher capability in executing solutions to problems of system control. Embodiments of servo system 118 can operate in the harsher control environment presented by optical drive 100 and are capable of higher versatility towards upgrading servo system and refinement of servo system algorithms than in conventional systems.

Further requirements for optical drive 100 can include error recovery procedures. Embodiments of optical drive 100 which have a small form factor can be used in portable packages and are therefore subject to mechanical shocks and temperature changes, all of which affect the ability to extract data (e.g., music data) from optical medium 106 reliably or, in some cases, write reliably to optical medium 106. Since optical drive 100 may have tighter tolerances than conventional drives, some embodiments of servo system 118 include dynamic calibration procedures. Calibration procedures are discussed more fully in application Ser No.09/950,398, filed concurrently with the present application, herein included by reference in its entirety.

Figure 3:
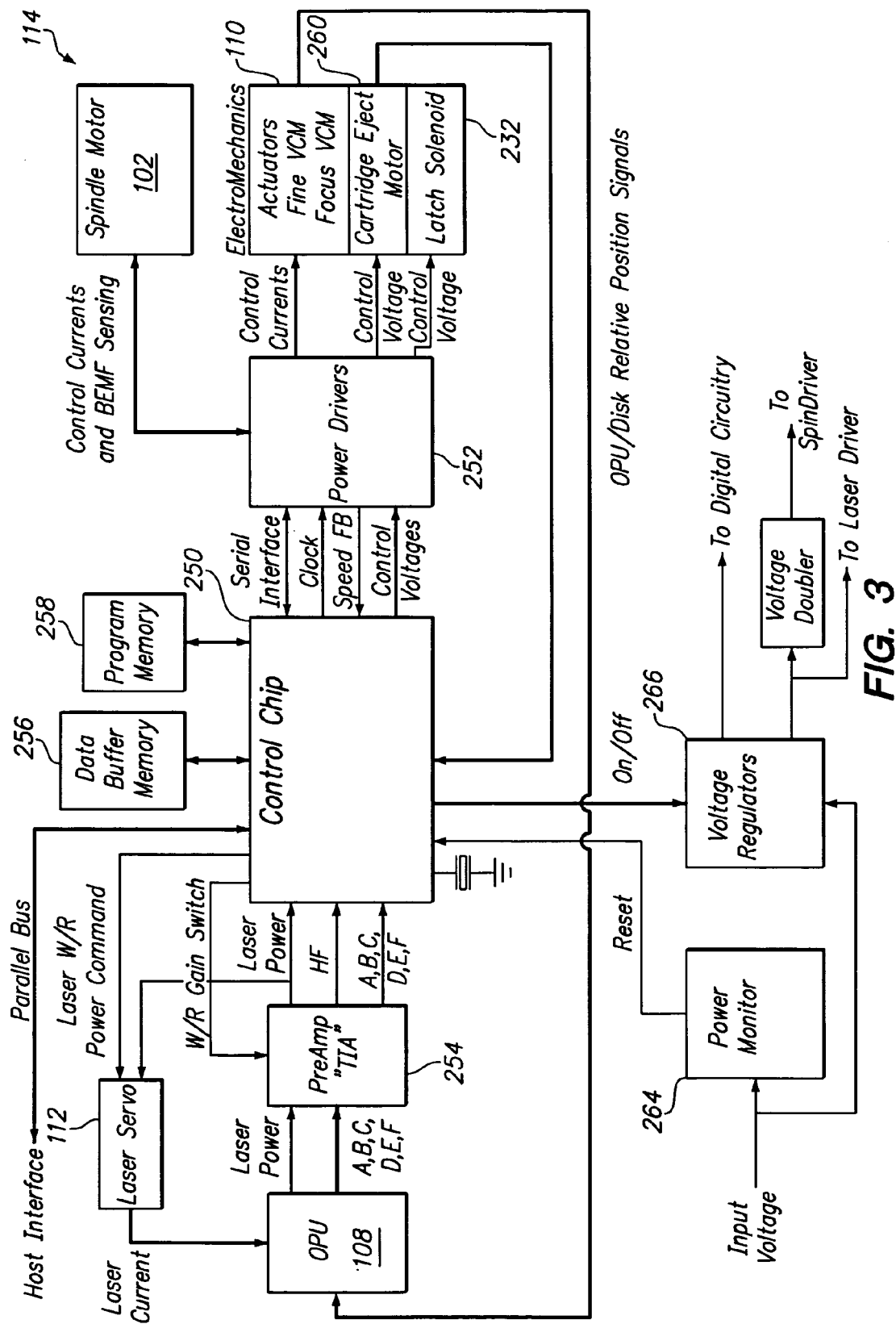
FIG. 3 shows a block diagram of the components of a control system of an optical drive according to the present invention.

FIG. 3 shows a block diagram of an embodiment of control system 114 according to the present invention. Optical signals are received from OPU 108. As discussed above with reference to FIGS. 2B, 2C and 2D, some embodiments of OPU 108 include two arrays of detectors with array 225 including detectors 231, 232, and 233 for providing signals A, E, and C, respectively, and array 226 having detectors 234, 235 and 236 providing signals B, F, and D, respectively.

Signals received from OPU 108 are typically current signals. Therefore, the signals from OPU 108 are converted to voltage signals in a preamp 254. Preamp 254 can include a transimpedance amplifier, which converts current signals to voltage signals. Further, preamp 254 generates a high frequency (HF) signal based on the input signals from OPU 108. The HF signal can be formed by the analog sum of the signals from OPU 108 (signals A, B, C, D, E and F).

The voltage signals A, B, C, D, E, F and HF from preamp 254 are input signals to control chip 250. Control chip 250 is a digital and analog signal processor chip which digitally performs operations on the input signals A, B, C, D, E, F, HF, and laser power to control the actuators of actuator arm 110 (FIG. 1A), the laser power of laser 218 (FIG. 2B), and the motor speed of spin motor 102. Control chip 250 also operates on the HF signal to read the data and communicates data and instructions with a host (not shown). A type of control chip, Part No. 34-00003-03 is available from ST Microelectronics.

The laser power signal is further input to laser servo 112 along with the W/R command. In some embodiments, laser servo 112 is an analog servo loop that controls the power output of laser 218 of OPU 108. In some embodiments, the laser power can also be included in a digital servo loop controlled by control chip 250. In one embodiment, the laser power of laser 218 is high for a write operation and low for a read operation. Laser servo 112 holds the power of laser 218 to a high power or low power in response to the laser W/R power control signal from control chip 250.

In FIG. 3, control chip 250 is further coupled with data buffer memory 256 for buffering data to the host and program memory 258. Program memory 258 can hold program code for performing the servo functions, for controlling focus and tracking functions, laser power, and motor speed, among other functions. Data read through OPU 108 can be buffered into data buffer memory 256, which assists in power savings and allows more time for error recovery if optical drive 100 suffers a mechanical shock or other disturbing event.

In some embodiments, control chip 250 is a low power device, which operates at small currents. Control voltages for controlling focus and tracking actuators are input to power driver 252. Power driver 252 outputs the current required to affect the focus and tracking functions of actuator arm 110 to focus actuator 208 and tracking actuator 204. In some embodiments, as described above, focus actuator 208 and tracking actuator 204 can be voice coil motors mounted on actuator arm 110 so that tracking actuator 204 moves OPU 108 over tracks and focus actuator 208 flexes actuator arm 110 to affect the distance between OPU 108 and optical medium 106. Embodiments for seeking and tracking functions which can be used in accordance with embodiments of the present invention are further described in U.S. application Ser. No. 09/950,329filed concurrently with the present application which is herein incorporated by reference for all purposes.

Power driver 252 also provides current to drive spin motor 102. Spin motor 102 can provide sensors to track the position of OPU 108 so that the speed of spin motor 102 can be related to the track. In some embodiments, the data rate is held constant by controlling the speed of spin motor 102.

In one embodiment, power driver 252 can also control a cartridge eject motor 260 and latch solenoid 262 in response to commands from control chip 250. In one embodiment, cartridge eject motor 260 mounts and dismounts optical medium 106 onto spin motor 102. Latch solenoid 262 provides a means to latch the actuators so that they cannot move in the focus or tracking directions when the drive is not active. This is to prevent actuator or disk damage during a non-operating shock.

In one embodiment, control system 114 can include power monitor 264 and voltage regulator 266. Power monitor 264 provides information about the power source to control chip 250. Power monitor 264, for example, can reset control chip 250, in the event of a power interruption. In one embodiment, voltage regulator 266, in response to an on/off indication from control chip 250, provides power to drive laser 218, spin motor 102, actuators 208 and 204, cartridge eject motor 260, and latch solenoid 262.

Figure 4:
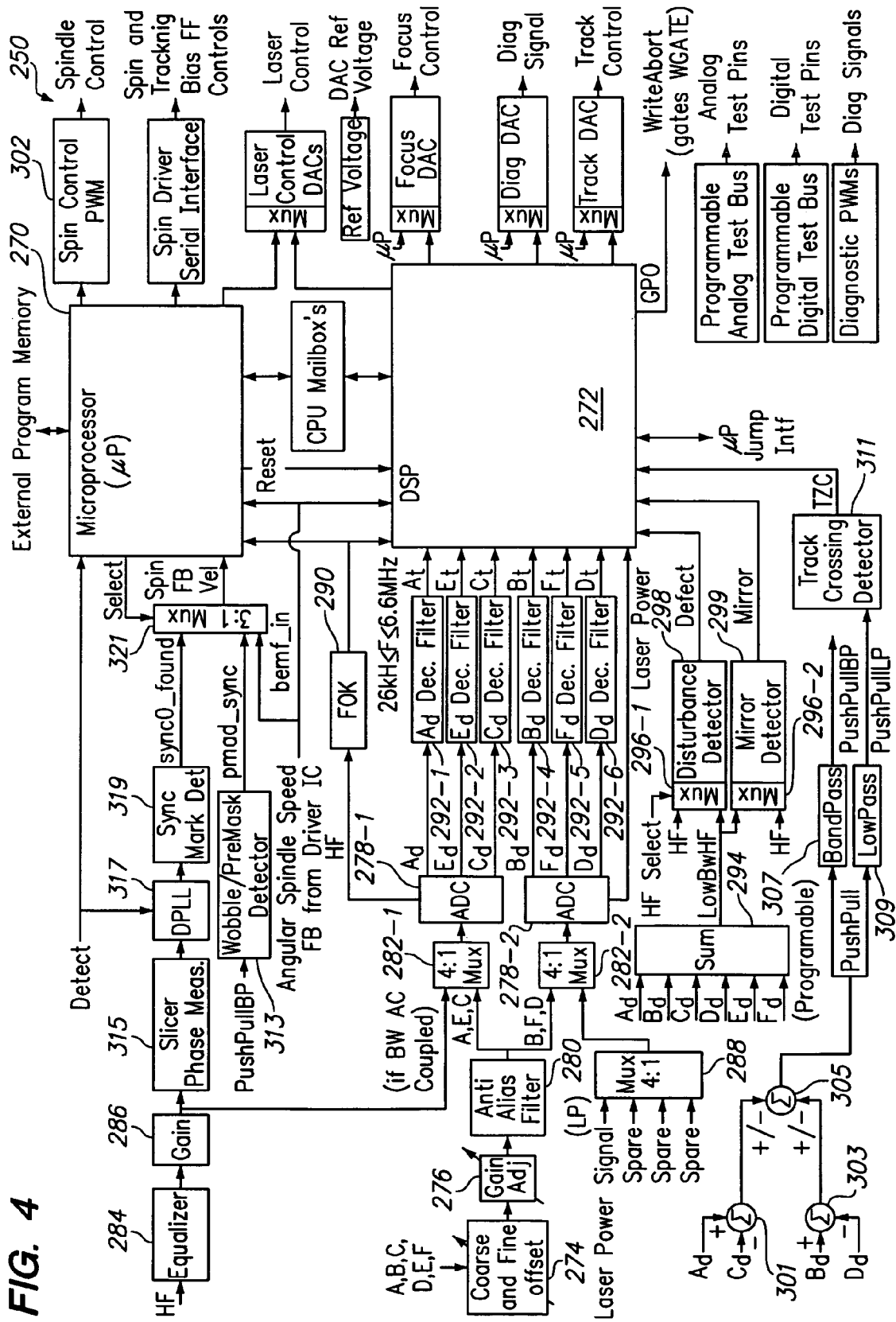
FIG. 4 shows a block diagram of the controller chip shown in the block diagram of FIG. 3 according to the present invention.

FIG. 4 shows control chip 250 in accordance with an embodiment of the present invention. Control chip 250 can include a microprocessor 270 and a digital signal processor (DSP) 272. Real time digital servo systems can be executed on DSP 272 while other control functions can be executed on microprocessor 270. A control structure for embodiments of control chip 250, and interactions between DSP 272 and microprocessor 270, are further discussed in U.S. application Ser. No. 09/951,947, herein incorporated by reference in its entirety.

As shown in FIG. 4, signals A, E, C, B, F and D are input from preamp 254 (FIG. 3) into offset block 274. Offset block 274 provides a variable offset for each of input signals A, E, C, B, F, and D. The value of the offset is variable and can be set by a calibration routine in offset and gain calibration operating in microprocessor 270 or DSP 272.

The signals output from offset block 274 are input to variable gain amplifiers 276. The gains provided through variable gain amplifiers 276 are set by a calibration routine executed in microprocessor 270 or DSP 272, as described in application Ser. No. 09/950,398, previously incorporated herein. The offsets and gains of offset block 274 and amplifiers 276, respectively, may be different for each of signals A, E, C, B, F, and D. Further, the gains and offsets may be different for read operations and write operations and may be different for pre-mastered verses writable portions of optical medium 106. Further, the offsets and gains may vary as a function of position on the disk (in addition to varying between pre-mastered or writable regions). Some factors which may further lead to offset and gain settings include light scattering onto detectors, detector variations, detector drift, or any other factor which would cause the output signal from the detectors of OPU 108 to vary from ideal outputs. Various calibration and feedback routines can be operated in microprocessor 270 and DSP 272 to maintain efficient values of each of the offset and gain values of offset block 274 and amplifiers 276, respectively, over various regions of optical medium 106.

In some embodiments the offset and gain values of offset block 274 and amplifiers 276 can be varied by microprocessor 270 and DSP 272 as OPU 108 is positionally moved over optical medium 106. In some embodiments microprocessor 270 and DSP 272 monitor the offset and gain values of offset block 274 and amplifiers 276 in order to maintain optimum values for the offset and gain values as a function of OPU 108 position over optical medium 106. In some embodiments, the offset values of offset block 274 and amplifiers 276 are determined such that the dynamic range of the respective input signals are centered at zero. Further, the gains of amplifiers 276 are set to fill the dynamic range of analog-to-digital converters 278-1 and 278-2 in order to reduce quantization error.

The output signals from variable gain amplifiers 276 can be input to anti-aliasing filters 280. Anti-aliasing filters 280 can be low-pass filters designed to prevent aliasing. In some embodiments, the output signals from each of anti-aliasing filters 280 are input to analog-to-digital converters. In the embodiment shown in FIG. 4, the output signals from anti-aliasing filters 280 are input to multiplexers 282-1 and 282-2.

The HF signal from preamp 254 (FIG. 3) is input to equalizer 284. Equalizer 284 equalizes the HF signal by processing the signal through a transfer function that corrects systematic errors in detecting and processing data read from optical medium 106. In some embodiments, equalizer 284 operates as a low-pass filter since the data signals are at high frequency. The output signal from equalizer 284 is input to amplifier 286. The output signal from amplifier 286 is input as a fourth input to multiplexer 282-1.

The laser power signal LP can be input to multiplexer 288 where LP can be multiplexed with other signals that may require digitization. The output signal from multiplexer 288 can be input as a fourth input to multiplexer 282-2. One of ordinary skill in the art will recognize that if no other signals are being digitally monitored, multiplexer 288 can be omitted. Further, one of ordinary skill in the art will recognize that any number of analog-to-digital converters can be utilized and any number of signals can be multiplexed to use the available number of analog-to-digital converters. The particular embodiment shown here is exemplary only.

The output signal from multiplexer 282-1 is input to analog-to-digital converter 278-1. The output signal from multiplexer 282-2 is input to analog-to-digital converter 278-2. In some embodiments, analog-to-digital converters 278-1 and 278-2 can be, for example, 10 bit converters sampling at a rate of 20.6 MHz, with each sample being taken from a different input of multiplexers 282-1 and 282-2, respectively. In one embodiment, the effective sampling of each of the input signals is about 5 MHz.

The digitized signals from analog-to-digital converts 278-1 and 278-2 are the digitized and equalized HF signal $HF_d$, the digitized laser power signal $LP_d$, and digitized detector signals $A_d$, $E_d$, $C_d$, $B_d$, $F_d$, and $D_d$. Digitized laser power signal $LP_d$ is input to DSP 272 and can be used in a digital servo loop for controlling laser power or in determination of gain and offset values for various components.

The digitized HF signal $HF_d$ is input to focus OK (FOK) 290, which outputs a signal to DSP 272 and microprocessor 270 indicating whether focus is within a useful range. Since detectors 225 and 226 may not be very large, when OPU 108 has become substantially out of focus, light can be lost off detectors 225 and 226 (FIG. 2B). FOK 290 determines if the total intensity of light on detectors 225 and 226 is above a threshold value indicating a near in-focus condition. In some embodiments, this function can also be executed in software in the servo system.

Digitized detector signals $A_d$, $E_d$, $C_d$, $B_d$, $F_d$, and $D_d$ are input to decimation filters 292-1 through 292-6, respectively. Decimation filters 292-1 through 292-6 are variable filters which down-sample the digitized detector signals $A_d$, $E_d$, $C_d$, $B_d$, $F_d$, and $D_d$ to output signals $A_f$, $E_f$, $C_f$, $B_f$, $F_f$, and $D_f$, which are input to DSP 272. In some embodiments, each of signals $A_d$, $E_d$, $C_d$, $B_d$, $F_d$, and $D_d$ can be effectively sampled at 6.6 MHz by ADC 278-1 and 278-2. Decimation filters 292-1 through 292-6 can then down-sample to output signals $A_f$, $E_f$, $C_f$, $B_f$, $F_f$, and $D_f$ at, for example, about 90 kHz. Embodiments of decimation filters 292-1 through 292-6 can down-sample to any sampling rate, for example from about 26 kHz to about 6.6 MHz.

Although the data signals are at high frequency, the servo information can be at lower frequencies. The mechanical actuators 208 and 204 of actuator arm 110 can respond in the hundreds of Hertz range yielding servo data in the 10s of kHz range, rather than in the mHz ranges of optical data. Further, mechanical resonance of actuator arm 110 can occur in the 10s of kHz range. Therefore, down-sampling effectively filters out the high frequency portion of the spectrum which is not of interest to servo feedback systems. Further, a much cleaner and more accurate set of digital servo signals $A_f$, $E_f$, $C_f$, $B_f$, $F_f$, and $D_f$ are obtained by the averaging performed in decimation filters 292-1 through 292-6, respectively. In some embodiments, decimation filters 292-1 through 292-6 can be programmed by microprocessor 270 or DSP 272 to set the output frequency and further filtering characteristics.

In one embodiment, a wobble signal at about 125 kHz in the writable portion of optical medium 106 can result from a modulation in the physical track in that region. The wobble signal can be filtered out of signals $A_f$, $E_f$, $C_f$, $B_f$, $F_f$, and $D_f$. Similarly, a stabilized frequency on laser power at 500 MHz, from modulator 219 (FIG. 2B) can be filtered out of signals $A_f$, $E_f$, $C_f$, $B_f$, $F_f$, and $D_f$. In one embodiment, signals $A_f$, $E_f$, $C_f$, $B_f$, $F_f$, and $D_f$ only include sensor noise and real disturbances that can be followed by a servo system operating on, for example, actuator arm 110. Disturbances can include stamping errors in the mastering process, since tracks will not be perfectly layed. In addition, spin motor 102 may provide some errors through bearings which cause vibration. Additionally, optical medium 106 may not be flat. Tracking and focus servo functions, as well as the servo systems tracking laser power and the rotational speed of spin motor 102, can follow these errors. The spectral response of the servo system can be responsive to the frequency range of the errors that are being tracked. Embodiments of optical drive 100 operate in extremes of physical abuse and environmental conditions that may alter the resonant frequency characteristics and response characteristics of spin motor 102, optical medium 106, and actuator arm 110.

Referring again to FIG. 4, the digital output signals $A_d$, $E_d$, $C_d$, $B_d$, $F_d$, and $D_d$ are further input to summer 294. Summer 294 can be a programmable summer so that a sum of particular combinations of inputs $A_d$, $E_d$, $C_d$, $B_d$, $F_d$, and $D_d$ can be utilized. Summer 294 sums a selected set of signals $A_d$, $E_d$, $C_d$, $B_d$, $F_d$, and $D_d$ to form a low-bandwidth digitized version of the HF signal. The output signal from summer 294 is multiplexed in multiplexer 296-1 and multiplexer 296-2 with the digitized HF signal $HF_d$ output from ADC 278-1. A HF select signal input to each of multiplexer 296-1 and 296-2 selects which of $HF_d$ or the output signal from summer 294 are chosen as the output signal from multiplexer 296-1 and 296-2. The output signal from multiplexer 296-1 is input to disturbance detector 298. Disturbance detector 298 detects a media defect to optical medium 106 by monitoring the data signal represented by $HF_d$ or the output from summer 294 and alerts DSP 272 of a defect. A defect can include, for example, a scratch or speck of dust on optical medium 106.

The output signal from multiplexer 296-2 is input to mirror detector 299. Mirror detector 299 provides a signal similar to that from track crossing detector 311, but 90 degrees out of phase. DSP 272 receives the mirror signal and, in combination with other signals calculated within DSP 272, can determine direction of motion while track seeking.

Additionally, signals $A_d$ and $C_d$ are received in summer 301, which calculates the value $A_d$–$C_d$. Further, signals $B_d$ and $D_d$ are input to summer 303 which calculates the value $B_d$–$D_d$. The output signals from summer 301 and summer 303 are input to summer 305, which takes the difference between them forming a tracking error signal (TES) from the digitized detector output signals. The TES signal from summer 305 is input to a bandpass filter 307. The output signal from bandpass filter 307 is PushPullBP. The output signal from summer 305 is further input to a lowpass filter 309. The output signal from lowpass filter 309 is input to track crossing detector 311 which determines when the TES signal calculated by summer 305 has crossed a track. The output signal from track crossing detector 311 is the TZC signal and is input to DSP 272.

In one embodiment, the signal PushPullBP is input to Wobble/PreMark detector 313. In some embodiments, in the writeable portion of optical medium 106 the tracks have a predetermined wobble which have a distinct frequency. Bandpass filter 307 can be set to pass TES signals of the distinct frequency so that detector 313 detects the wobble in the track. In this embodiment, the frequency of wobble in the track from detector 313 can be indicative of the rotational speed of spin motor 102.

In another embodiment, the signal from gain 286 can be input to slicer 315, DPLL 317, and sync mark detector 319 to provide another indication of the speed of spin motor 102.

Slicer 315 determines a digital output in response to the output signal from equalizer 284 and amplifier 286. Slicer 315 indicates a high state for an input signal above a threshold value and a low state for an input signal below the threshold. DPLL 317 is a digital phase-locked loop, which servos a clock to the read back signal so that sync marks on the tracks can be detected. Sync mark detector 319 outputs a signal related to the period between detected sync marks, which indicates the rotational speed of spin motor 102.

In yet another embodiment, an angular spindle speed feedback indication, for example, the bemf_in signal, can be used as an indication of the speed of spin motor 102. Each of these speed indications can be input to multiplexer 321, whose output is input to microprocessor 270 as the signal which indicates the rotational speed of spin motor 102. Microprocessor 270 can choose through a select signal to multiplexer 321 which of the rotational speed measurements to use in a digital servo loop for controlling the rotational speed of spin motor 102.

In some embodiments, the wobble frequency of Push-PullBP is in the 100 kHz range (in some embodiments around 125 kHz) and therefore, with decimation filters 292-1 through 292-6 operating at around 70 kHz, is filtered out of signals $A_f$, $E_f$, $C_f$, $B_f$, $F_f$, and $D_f$.

Microprocessor 270 and DSP 272 output control signals to drivers which affect the operation of optical drive 100 in response to the previously discussed signals from actuator arm 110 and spin motor 102. For example, a control signal from microprocessor 270 is output to spin control servo module 302 to provide a spin control signal for controlling spin motor 102. A digital servo system executed on microprocessor 270 or DSP 272 is further discussed below.

In embodiments of optical drive 100 with a digital servo loop for controlling laser power, a signal from microprocessor 270 or DSP 272 is input to a laser control digital to analog converter to provide a control effort signal to the laser driver of laser servo 112 (FIG. 3). A focus control signal can be output from either microprocessor 270 or DSP 272 to a focus digital to analog converter to provide a focus control signal to power driver 252 (FIG. 3). A tracking control signal can be output from either microprocessor 270 or DSP 272 to a tracking digital to analog converter to provide a tracking control signal to power driver 252. A diagnostic digital to analog converter and other diagnostic functions, such as analog test bus, digital test bus, and diagnostic, may also be included. Further a reference voltage generator may be included to provide a reference voltage to various digital-to-analog converters.

Microprocessor 270 and DSP 272 can communicate through direct connection or through mailboxes. In some embodiments, DSP 272 operates under instructions from microprocessor 270. DSP 272, for example, may be set to perform tracking and focus servo functions while microprocessor 270 provides oversight and data transfer to a host computer or to buffer memory. Further, microprocessor 270 may provide error recovery and other functions. Embodiments of control architectures are further discussed in U.S. application Ser. No. 09/951,947, previously incorporated by reference.

In some embodiments, DSP 272 controls tracking and focus servo systems while microprocessor 270 controls all higher order functions, including error recovery, user interface, track and focus servo-loop closings, data transport between optical medium 106 and buffer memory, and data transfer between the buffer memory and a host, read and write operations, and operational calibration functions (e.g., setting offset and gain values for offset 274 and amplifiers 276 and operational parameters for decimation filters 292-1 through 292-6).

Referring again to FIG. 1A, servo system 118 of control system 114 provides control of various functions of spin motor 102, such as spinning up spin motor 102 (start-up operation), maintaining the velocity of the spin motor (tracking operation) and managing the variability in the velocity of the spin motor (seeking operation). In general, the rotational velocity of spin motor 102 can be controlled in various modes of operation. In one embodiment, a first mode of operation is the constant linear velocity mode (hereinafter "CLV mode"). The format of optical medium 106 may require that OPU 108 travel across optical medium 106 from the OD to the ID with optical medium 106 spinning such that the data directly under OPU 108 travels at a constant linear velocity during read and/or write operations to provide and maintain a constant data rate to R/W data processing 116.

As the movement of actuator arm 110 causes the position of OPU 108 to vary along a radius of optical medium 106 during read and write operations, servo system 118 operates to adjust the spin velocity of spin motor 102 to cause optical medium 106 to spin faster or slower. In another embodiment, in a second mode of operation, the seek mode, actuator arm 110 can progress from the OD to the ID of optical medium 106 in search of a specific track or address. The seek mode can be characterized as requiring significant spindle velocity changes.

As described below, in the various modes of operation, each track or address on optical medium 106 corresponds to a specific desired period of rotation. In CLV mode, the current period of spin motor 102 at the address corresponding to the position of OPU 108 is compared to a reference period that corresponds to that address. From this comparison, it is determined whether rotor shaft 104 is going too fast or too slow.

In seek mode, a target period for an address to be obtained by seeking is compared to a current period corresponding to the current position of OPU 108 on optical medium 106. From this comparison, it is determined how much rotor shaft 104 must be accelerated or decelerated to reach the target period at the seek address. As detailed below, a lookup table module 306 (FIG. 5) provides the reference periods for this comparison.

In one embodiment, seek mode is used when the target spin speed is different from the current spin speed, for example, by more than 100 RPM. This is usually as a result of a seek command directing OPU 108 to a different radial position. In seek mode, control system 118 commands maximum acceleration if the motor speed is too slow and commands maximum deceleration if the motor speed is too fast. Seek mode can be disabled as soon as the speed is faster than the target speed when speeding up and as soon as the speed is slower than the target speed when slowing down. After seek mode is disabled, a proportional plus integral (P+I) control system, described in detail below, is used to perform the speed control.

Figure 5:
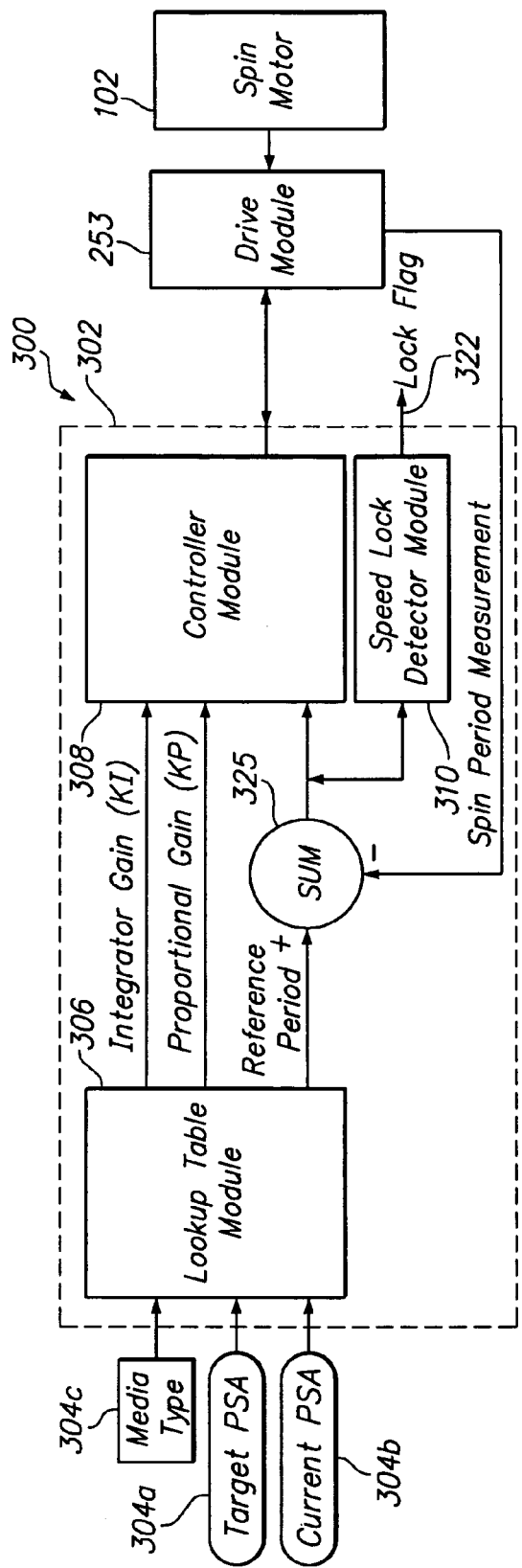
FIG. 5 shows a functional block diagram of a spin control servo block diagram for controlling the spin motor as shown in FIG. 3 according to the present invention.

Referring now to FIG. 5, a functional block diagram is shown of a spin control servo system 300 for controlling spin motor 102 in accordance with the present invention. Spin control servo system 300 can include control module 302 serially coupled to drive module 253, which is operationally coupled to spin motor 102. In some embodiments, control module 302 can further include lookup table module 306, controller module 308, speed lock detector module 310 and summing module 325. In this embodiment, with no intent to limit the invention thereby, control module 302 is described as being implemented in firmware algorithms running on microprocessor 270. As evident to one of ordinary skill in the art, control module 302 can be implemented in hardware as well. In this embodiment, the circuitry and processing capability of control module 302 is resident on control chip 250 (FIG. 3).

Referring again to FIG. 5, in one embodiment, control module 302 receives a physical sector address (PSA), which is generally indicative of the location of data on optical medium 106 (e.g., the unique address of each track and sector, FIG. 1C). The PSAs can be encoded at the beginning of each sector in the Mastered Media portion of optical medium 106. On writable media the Pre-mastered Address (PMAD) is encoded in the track wobble signal, which yields the same information as the PSAs. Hereinafter the PSA and PMAD can be used interchangeably to refer to an address of a track or sector on optical medium 106.

Control chip 250 reads the PSAs anytime the tracking servo is actively following a track. As described below, lookup table module 306 includes a list of reference periods that correspond to a spin speed when reading or writing at the corresponding PSA. A substantial match between the Reference Period from lookup table module 306 and a measured Spin Period indicates that spin motor 102 is substantially spinning at the desired RPM. When reading or writing large amounts of data, lookup table module 306 can be used to slowly adjust the Target Spin Period as the PSA numbers continue to increment.

In one embodiment, target PSA 304a, shown in FIG. 5, can be used to determine the Target Spin Period for the read or write operation that occurs at the end of a seek operation. In general, the system wants to read or write to the address represented by target PSA 304a. Current PSA 304b represents the PSA last detected during reading and writing operations before movement to a new position. Thus, target PSA 304a and current PSA 304b provide feedback used to determine the desired spindle velocity at any given OPU 108 position. The radial position can be translated to an RPM, since the Linear Velocity of the track is related to the RPM and the radial position of OPU 108. In some embodiments, control module 302 receives a media type indication 304c from the DSA (FIG. 1C) that provides information about optical medium 106, such as the type of media being used and the PSA/PMAD boundaries for the pre-mastered and mastered portions. As described below, media type indication 304c ensures that data is acquired from the proper data table corresponding to either the mastered or pre-mastered portions of optical medium 106 as appropriate.

Lookup table module 306 includes logic capable of receiving input target PSA 304a or current PSA 304b and media type indication 304c. The PSAs are represented by an integer number, which can be used as an Index to enter lookup table 306 and locate reference data, such as a reference period, a proportional gain (Kp) and integrator gain (Ki) corresponding to the PSA number.

In one embodiment, a correction factor can be applied in the event that controller module 308 misses a reading of one or several PSAs. For example, a PSA can be delivered every 2 msec. Thus, if 4 msec have passed since controller module 308 reads a PSA, the algorithm adds 2 (4 msec/2) to the last PSA number read. The corrected PSA can then be used as the Index for lookup table module 306 to provide the reference data for controller module 308.

In one embodiment, lookup table 306 can be divided into a first and a second lookup table. The first lookup table can include reference data corresponding to the PSAs found in the pre-mastered portion of optical medium 106. The second lookup table can include reference data corresponding to the PSAs found in the writeable portion of optical medium 106. Media type indication 304c can be used to direct the system to the proper table. In this embodiment, the first and second lookup tables allow optical disk system 100 to operate in a dual media mode.

Physical sector address 304a and PSA 304b can be received at any rate based upon such parameters as the design of spin motor 102 and servo system 118. For example, PSA 304a and PSA 304b can be received in control module 302 at an average rate of about two milliseconds.

The PSA number indicates a row in lookup table 306. The PSA Index is a number corresponding to an element in a row, 1-N, in lookup table 306. To calculate the PSA Index, the PSA number is divided by the number of PSAs per row in the lookup table. For example, the portion of the table including the reference period table can be indexed by 256 PSAs per row. Thus, if the PSA number received is 2500 and the lookup is for the reference period, the PSA Index is 2500/256=9 (integer divide). Accordingly, the target spin period is the $9^{th}$ element in the table.

Lookup table module 306 can include logic to provide an integrator gain (Ki) and a proportional gain (Kp). As detailed below, in one embodiment, Ki and Kp are functions of the reference period corresponding to each PSA. Gains Ki and Kp can be formulated using an equation that accounts for measuring Spin Period (proportional to 1/RPM) and controlling Spin Speed (RPM). In one example, Ki and Kp can be determined using the equations as follows:

$$Ki=K_2/(K_1/\text{RPM})$$

$$Kp=K_4/(K_3/\text{RPM})$$

Where $K_1$, $K_2$, $K_3$, and $K_4$ are integer constants, which can be determined by simulation of the spin control system.

Alternatively, any number of methods could be used to generate the Ki and Kp signals, such as, for example, simulating the speed control loop at each target Spin Period.

In accordance with the present invention, lookup table module 306 provides for faster operations to be performed by microprocessor 270, since a 1/period calculation is not necessary to determine spin RPM.

Summing module 325, including summing circuitry, is provided to compare the Reference Period from lookup table module 306 for a given PSA to a spin period measurement generated from a speed interrupt pulse provided from drive module 253, as described below. The time is recorded at each occurrence of the speed interrupt pulse received by summing module 325. The time is compared to a previously recorded time corresponding to a previously received speed interrupt pulse, the difference in time representing the spin period measurement. Summing module 325 generates a feedback element representing the Period Error between the Reference Period and the Measured Period of spin motor 102.

Speed Lock Detector Module 310 can include logic to determine if the Period Error is acceptable to allow the read and write functions to adequately perform. For example, in one embodiment, speed lock detector 310 can be a comparator that provides a check to determine if the feedback element is substantially proximate to the Reference Period at the corresponding PSA to be able to begin or continue to perform read/write operations, as desired. When appropriate, speed lock detector 310 outputs a Lock Flag 322, which is a global flag that provides an indication that the speed control is at the desired level for read or write operations. In one embodiment, Lock Flag 322 can be used to determine when the Spin Up is complete, and can be used to initiate spin system recovery as disclosed in U.S. patent application Ser. No. 09/568,450, incorporated herein by reference.

Controller module 308 performs an integration function, which provides an output command, used by drive module 253 to, in turn, provide a drive output, used to start, stop, and quickly change the spin speed of spin motor 102, as desired.

Controller module 308 is provided with Ki and Kp from lookup table module 306 that correspond to a PSA. Typically, controllers used in motor control servos, such as in hard drives, have a fixed sample period, since the target RPM is constant. Accordingly, in typical controllers a fixed gain for a proportional and a fixed gain for the integral controller can be used that provides the dynamics or bandwidth required to provide controls solutions.

In accordance with the present invention, after the initial spin up of spin motor 102, the period of optical drive 100 can vary as spin motor 102 changes velocity, for example, from about a 1500 RPM to a 4500 RPM. Controller module 308 keeps the servo control bandwidth constant as RPMs vary by using different and variable proportional and integral gaining for all sample rates. As mentioned, the Period Error is input to controller module 308 from summing circuitry 325. Controller module 308 updates the Integrator value, as necessary, by incrementing the Integrator value by the product of Ki and the Period Error. Similarly, controller module 308 increments the proportional value by calculating the product of Kp and the Period Error to generate the output command.

Integrator Value=Integrator Value+(Period Error*$Ki$)

Output Command=(Period Error*$Kp$)+Integrator Value

Thus, the Integrator value is the sum of the product of Ki times the Period Errors for all time since the Integrator Value is initialized.

Controller module 308 provides the output command to drive module 253, which allows drive module 253 to determine the amount of voltage to apply to change the speed of spin motor 102. In one embodiment, the output command can be a 9 bit number, which can be sent over a serial interface to drive module 253.

Drive module 253 is provided to interface directly to spin motor 102 and control the electrical commutation of spin motor 102 once the spin motor begins to run (i.e., after start module 400 (FIG. 6) is performed). As previously mentioned, drive module 253 provides the spin interrupt pulses used to measure the Spin Period and control Spin Speed.

Drive module 253 provides a pulse or an interrupt, which corresponds to each occurrence of a BEMF zero-crossing in spin motor 102, as described below. Drive module 253 detects the BEMF zero crossing on the coil leads that drive spin motor 102 to determine rotor position. In one embodiment, the BEMF zero crossing interrupts occur at a rate depending on the type of spin motor. For example, in a twelve-pole motor the BEMF zero crossing interrupts occur at a rate of 6 times per revolution. However, the spacing between interrupts can vary because the magnetic poles on the rotor are typically not perfectly spaced during motor manufacture.

Embodiments of an operational sequence of events for controlling spin motor 102 will now be described.

In accordance with the present invention, it is understood that spin motor 102 must achieve a nominal spin velocity to generate detectable BEMF zero crossings. At initial operation of optical drive 100, spin motor 102 can be stationary.

Figure 6:
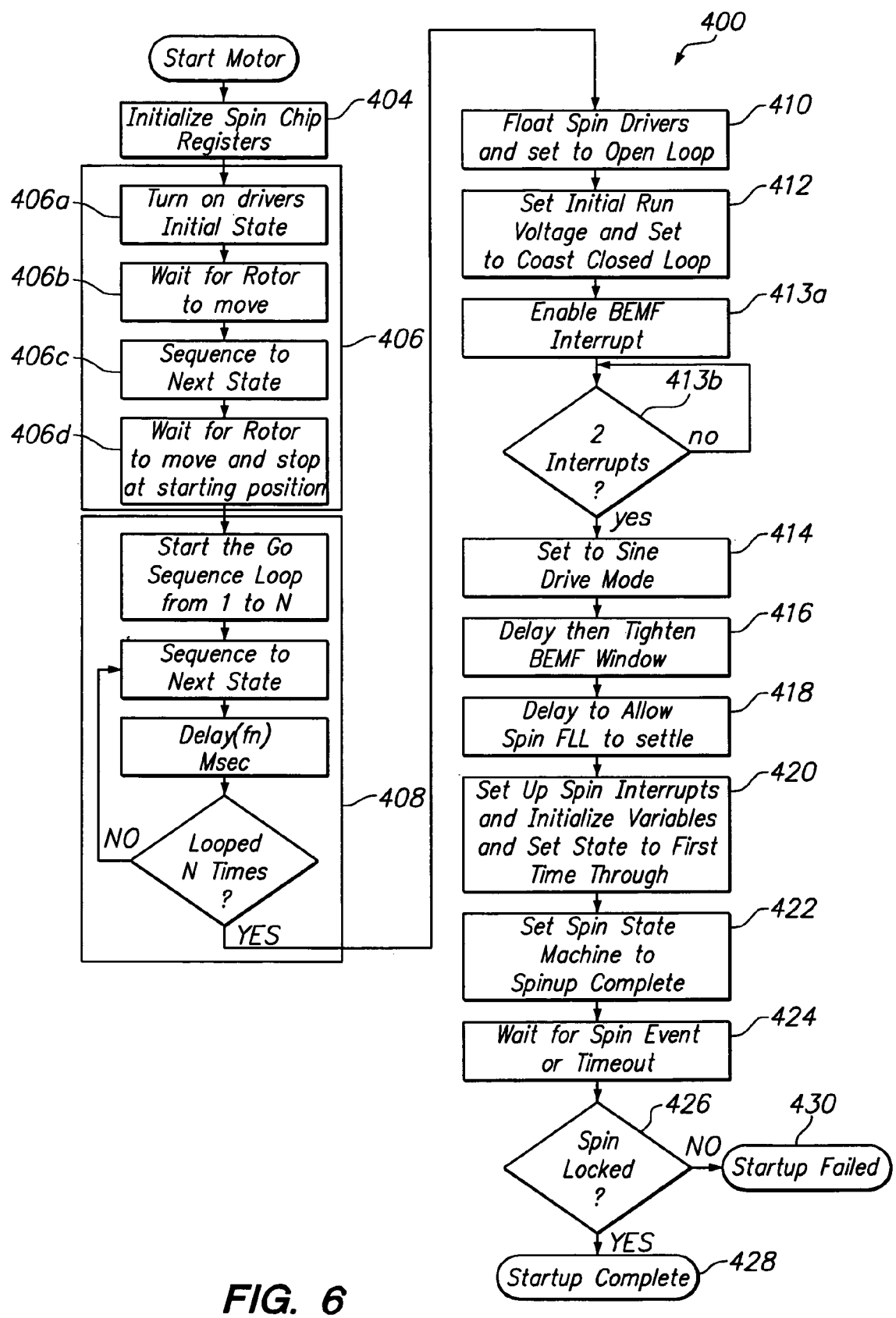
FIG. 6 shows a start spin algorithm for spinning up the spin motor of FIG. 1B according to the present invention.

In one embodiment, as illustrated in FIG. 6, a start-up logic 400 is provided to begin the movement of spin motor 102. For example, when spin motor 102 is stationary, the initial start-up sequence of spin motor 102 can be an open-loop sequence (i.e., no feedback) until the motor reaches the nominal speed.

FIG. 6 is a flow diagram illustrating an embodiment of start module 400 for causing the initial movement of spin motor 102 of FIG. 1B in accordance with the present invention. In general, start module 400 includes logic that initiates movement of spin motor 102 from a non-moving, non-spinning or stationary condition to a moving, spinning or non-stationary condition. The non-moving condition may include any time the rotation of spin motor 102 is inadequate to provide efficient operation of optical drive 100. Start module 400 can be implemented any time that spin motor 102 needs to spin up optical medium 106.

In most embodiments, start module 400 has substantially no information at startup about the position or state of spin motor 102 or the alignment of rotor shaft 104. Start module 400 initializes the system hardware to set up the operational parameters.

In action 404, a plurality of registers, such as a current limiter, torque optimizer, fine torque optimizer, Kval, lock-speed, drive mode, and closed loop, coast, and brake, are initialized with operational parameters. Generally, the parameters provide information regarding the amount of current to use.

In action 406, an alignment phase is provided in which rotor shaft 104 is caused to move to a known state or position. In one embodiment, the known state is such that a specific sequence of applied voltages causes the spin motor 102 to generate torque and accelerate in the desired direction. In one embodiment, spin motor 102 can have 6 states per electrical cycle and, 6 electrical cycles per revolution. Thus, in this embodiment it takes 36 state transitions to move spin motor 102 one revolution.

In action 406a of alignment phase 406, drivers are turned on and a first coil in spin motor 102 is selected to represent the initial state or first state, which causes the first coil to be initialized or powered up. The drivers are the circuits in power driver 252 that cause current to flow in the coils. In powering up the first coil, rotor shaft 104 can be made to move, such that rotor shaft 104 is jogged to an initial position. In one embodiment, a pair of drivers can be connected to each of the three motor coils. The state of sequencer 326 (FIG. 1B) determines which drivers are turned on and whether the drivers pull the coil line to ground or to a Power Supply. If a specific coil has current flowing through it, the specific coil will attract the rotor to a given position. The rotor stops in this position until the next coil is energized, which causes the rotor to move to the next position. If this next coil stays energized with a fixed current then the rotor will stop in this next position.

In action 406b, start module 400 pauses long enough to allow the motor to move to the aligned position and settle down. The duration of the pause can be any desired time, such as between about 100 milliseconds and about 300 milliseconds.

In action 406c, a second state is achieved by powering a second coil positioned adjacent to the first coil in the preferred direction of rotation. In one embodiment, the powering of the second coil causes rotor shaft 104 to move slightly in the preferred direction. The powering up of the second coil substantially ensures, for example, that if spin motor 102 is in a very low torque position (i.e., high friction) during the first state, enough torque is generated to align rotor shaft 104.

In action 406d, the routine in module 400 pauses again for a time period long enough to allow spin motor 102 to settle down, for example, between about 100 and about 300 milliseconds.

Advantageously, alignment phase 406 of start module 400, substantially ensures that spin motor 102 is locked into a known fixed position and is ready to be rotated in a known direction. Unlike many typical spin motors, in some embodiments, since there is no physical contact between optical medium 106 and OPU 108, spin motor 102 does not require reverse rotation protection to prevent reverse movement that could damage, for example, OPU 108 and optical medium 106.

After completion of alignment phase 406, start module 400 begins a first acceleration phase. First acceleration phase 408 is open loop and occurs before spin motor 102 is moving fast enough to be monitored by drive module 253. In one embodiment, acceleration phase 408 provides an open loop step sequence to accelerate spin motor 102 to the nominal RPM, such as from about 900 RPM to about 1000 RPM.

In one embodiment, the acceleration of spin motor 102 can be made to follow a pre-designed acceleration profile. For example, the open loop startup runs spin motor 102 by timing the commutation steps. Since the load (i.e., the inertia of the optical medium 106) can be approximated, the open loop startup can be simulated. The simulation can yield the sequence of timing events. At the end of the timing sequence, the RPM of spin motor 102 can be made to match that of the simulation. Advantageously, the acceleration profile can be designed such that spin motor 102 is capable of accelerating at the rate of the profile under worst case conditions.

During acceleration phase 408, a sequence loop is initialized and made to accelerate spin motor 102 by stepping the motor through electrical states. During each iteration through the sequence loop, spin motor 102 is stepped to the next electrical state with a time delay between each successive state being made shorter using a variable delay. The number of iterations required to achieve the final RPM can be determined from the given acceleration profile. In one embodiment, the sequence loop continues for 1 to N iterations and/or until spin motor 102 has reached the nominal RPM. In some embodiments, the sequencing loop is made to perform from between 10 to 50 iterations, for example 25 iterations before reaching the nominal RPM.

Once spin motor 102 is rotating at the nominal RPM, start module 400 begins a process (actions 410–418) for synchronizing drive module 253 to the behavior of spin motor 102.

In action 410, drivers are floated with no load (i.e., turned off) and set to open loop, which means that spin motor 102 is coasting at approximately the nominal RPM. While coasting spin motor 102 may slow down due to friction and the like.

An initial Run Voltage is set during action 412 at a voltage sufficient to keep spin motor 102 operating at or near the nominal RPM to keep the motor spinning until the speed control firmware is enabled.

Action 413a of start module 400 enables the BEMF interrupt detection in drive module 253 after entering the coast phase. The BEMF detection capability in drive module 253 is enabled, such that drive module 253 begins to detect the BEMF zero crossings and provides BEMF interrupt pulses to summing module 325. Once at least two BEMF interrupts are detected (action 413b) drive module 253 can begin closed loop motor control. In an alternative embodiment, spin motor 102 can be allowed to coast for a fixed time duration, for example, 20 milliseconds, to provide enough time for at least two BEMF interrupts to be detected.

In action 414, drive module 253 is set to a sine drive mode. While spin motor 102 is coasting, the chip commutation, the voltage between a pair of windings, the magnets and the rotor create a sine wave variation on each of the windings. In this state, the voltage on the windings of spin motor 102 can be an AC waveform induced by the rotor magnets moving by the stator coils (i.e., BEMF). In operation, drive module 253 detects the BEMF zero crossing and initiates a pulse or BEMF interrupt. The BEMF interrupt causes a clock to record the time. At the next BEMF zero crossing, drive module 253 initiates a second pulse, which again causes the recording of the time. The difference between the two recorded times, indicates the period of the sine wave. In one embodiment, drive module 253 detects the BEMF zero crossings on one of the coils using, for example, an analog comparator circuit. The period indicates how fast spin motor 102 is rotating. Once the period is known, drive module 253 starts an internal state machine, which can commute spin motor 102. The state machine is hardware that generates the proper sequence of voltages applied to the windings of spin motor 102 to keep spin motor 102 spinning.

In action 416, drive module 253 provides a delay for a fixed time duration, for example, about 200 milliseconds. The delay is provided to allow the internal state machine to settle to the spin period before applying a rapid acceleration command. The delay ensures that the state machine does not lose synchronization.

After the delay, drive module 253 can be further synchronized to predetermine approximately where the next window for a BEMF zero crossing will occur. In this embodiment, the window is not a fixed time, but rather the window is a percentage of the last measured BEMF zero crossing period. If the window is loose (i.e., too large), the spin control becomes inefficient since spin motor 102 continues to coast (and slow down) while looking for the BEMF zero crossing. Better spin control and commutation is achieved having the search window as tight or small as possible. Drive module 253 searches a very narrow window for zero crossings using a modulating pulse. For example, drive module 253 causes a chopped voltage to be input into a coil of spin motor 102, such that the voltage chopping can be measured to know about where the zero crossing is going to occur. Drive module 253 shuts off that one coil while it is looking for the crossing In action 418, drive module 253 provides another delay for a fixed time duration, for example, 200 milliseconds. The second delay allows drive module 253 to settle, such that the velocity of spin motor 102 and the BEMF circuitry are synchronized. In this embodiment, after completion of action 418, spin motor 102 is performing under BEMF commutation, which means drive module 253 is detecting BEMF zero crossings and spin motor 102 remains synchronized with the interrupts continuously.

Once the spin motor 102 is under BEMF commutation, start module 400 enters into a second acceleration phase, where spin motor 102 is made to accelerate to a predetermined operational RPM. The operational RPM is selected to be fast enough to prevent inadvertently writing to optical medium 106.

As previously mentioned the BEMF zero crossing signal generates an interrupt every time a BEMF zero crossing occurs and summing module 325 measures the period between the crossings. In action 420, a spin interrupt module is set and variables are initialized. Spin interrupt module 420 provides for the actual speed control of spin motor 102. Spin interrupt module 420 includes a slew mode, described below, which accelerates (or decelerates) the speed of spin motor 102 to approach a target RPM. When called from start module 400, the target RPM is the operational RPM. A detailed description of spin interrupt module 420 is provided below with reference to FIG. 7.

In action 422, a state machine is set in speed lock detector 310 to indicate that the operational RPM has been achieved.

In action 424, the system waits to receive a spin event or time out signal. The time out signal signifies that no interrupts have occurred in a predetermined period indicating that spin motor 102 is not spinning properly. A spin event signifies that the spin up module has completed it's function.

In action 426, start module 400 checks the state of look detector 310. If lock detector 310 is locked then everything is working properly, with spin motor 102 spinning at the desired speed. If lock detector 310 is not locked, then the spin up has failed, which can cause optical drive 100 to enter into an error recovery mode of operation. An exemplary error recovery system is disclosed in application Ser. No. 09/950,398, which is herein incorporated by reference.

Start module 400 can require as much time as necessary to adequately start the movement of spin motor 102. In one embodiment, every time spin motor 102 is started and start module 400 is performed, it may take from approximately 200 milliseconds to about 1 second; for example 500 milliseconds total time to spin up and place spin motor 102 under BEMF commutation.

Once rotor shaft 104 of spin motor 102 is spinning at a nominal velocity (i.e., a velocity at which a BEMF crossing can be detected), spin control servo system 300 in accordance with the present invention can maintain the speed control of spin motor 102 (CLV mode) or can accelerate or decelerate (seek mode) to the speed required for new locations on optical medium 106. As described in greater detail below, regardless of the drive mode, the architecture of optical drive 100 and, in particular spin control servo system 300, provides various ways to measure and control the velocity adjustment.

Figure 7:
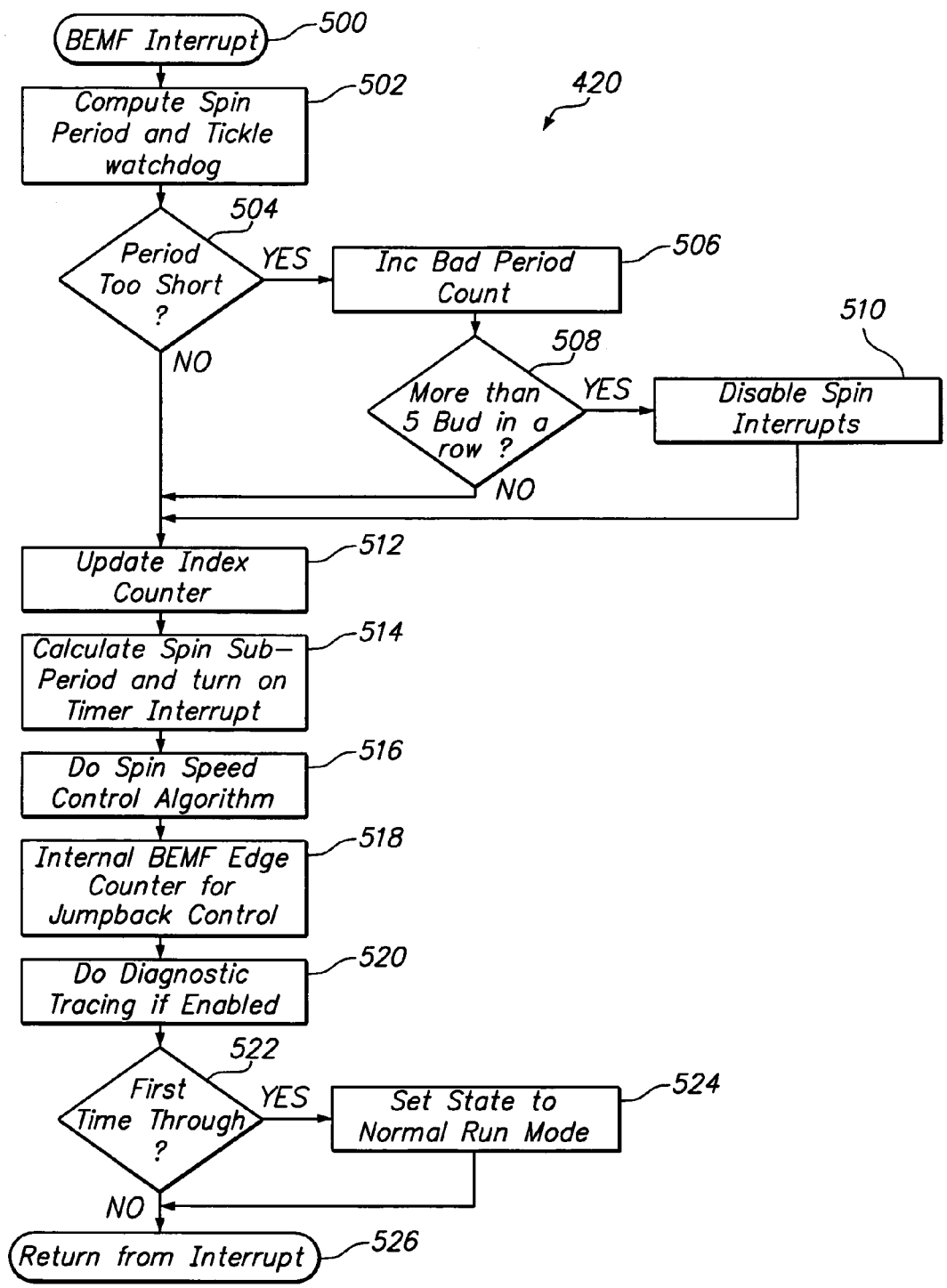
FIG. 7 shows a block diagram of the spin control interrupt algorithm executed on the system shown in FIG. 5 according to the present invention.

FIG. 7 shows a block diagram of a spin interrupt module 420 executed on spin control system 300 shown in FIG. 5 in accordance with the present invention. Spin interrupt module 420 provides the ability to measure the speed of spin motor 102. Spin interrupt module 420 can be called from start module 400 to provide speed control allowing spin motor to accelerate to the operational RPM. Spin interrupt module 420 can also be called when a large speed adjustment is needed, such as in a seeking operation or when a small speed adjustment is needed, such as during normal operation.

Although the BEMF interrupt is enabled during start up module 400, it is executed every time a BEMF interrupt occurs. In one embodiment, during CLV mode the BEMF interrupt happens 6 times per motor rotation at approximately every ⅙ of a rotation. For example, in action 500 BEMF interrupts are initiated 6 times per revolution by the BEMF crossing signal from drive module 253. At the time spin control interrupt 500 occurs, drive module 253 is already locked into the value of the timing that drive module 253 is using to measure the period.

In one embodiment, in action 502, logic can be provided that provides a "Watchdog" function, which records if and when interrupt 500 has occurred. By setting the Watchdog, error handling routines used to monitor spin motor 102 can be informed that the interrupts are occurring. The Watchdog function monitors the BEMF interrupts and determines if the BEMF interrupts stop occurring or if the BEMF interrupts start occurring too frequently. In either of these situations, the Watchdog indicates that an error has occurred and an error recovery action must be taken. For example, in the event that spin motor 102 is inadvertently stopped, spin control system 300 (FIG. 5) can be made to cease operation (i.e., freeze), since the watchdog logic (and subsequently, the error handling routines) does not sense that the next interrupt has occurred. The watchdog logic also monitors the rate of the occurrences, to ensure that the interrupts occur at some minimum rate.

In some instances, when spin motor 102 ceases to operate, BEMF interrupt pulses output from drive module 253 can become too close together in time to be considered accurate measurements. In action 504, spin control interrupt module 420 provides a checker to ensure that the period is not too short and, to check for a reasonable RPM value within the operating parameters of the spin motor 102. For example, a spin speed range for spin motor 102 may be between about 1800 RPMs to about 4500 RPMs. Thus, in this embodiment, the RPM checker could be set for a maximum allowable RPM of 6000 RPMs. Thus, in action 504, if the checker senses a period that would represent a velocity of 6000 RPMs or more, the checker implements a counter that registers that a "bad period" was sensed (action 506). Any number of bad periods can be allowed before initiating major error recovery algorithms, for example five bad periods in a row may be allowed before initiating major error recovery (action 508). The major error recovery disables the spin interrupt which then would cause an error recovery state machine to restart spin motor 102 (action 510). Once the period is believable the spin control interrupt module 420 continues its operation.

In action 512, a record of spindle position is maintained, for example, to know the angular position of optical medium 106. To accomplish this an Index Counter is used, which keeps track of the BEMF interrupts per revolution. In one embodiment, once the Index Counter senses six consecutive BEMF interrupts, the rotor is assumed back to the same position. The Index Counter can be used for several purposes. In one embodiment, the Index Counter is used to count revolutions during seeks to correct for spiral. For example, during a seek in the OD direction, a track can be added to the seek length for every index counted during the seek operation. Another use of the Index Counter is to synchronize the output waveform for repeatable runout feedforward control. The repeatable runout feedforward control requires an index and a sub-period.

In action 514, a spin sub-period is calculated to provide a better position resolution of the angular position of the spindle. The sub-period is equal to the last measured period divided by a number determined by the desired sub-period resolution, which in this example, is six. The sub-period can be updated every spin period. Advantageously, the sub-period provides a feed forward signal for the tracking and focusing, which follows runout. Thus, although the sub-period is not used in control of spin motor 102, action 514 is shown as part of interrupt module 420, since while controlling spin motor 102 the sub-periods can be created, to provide the absolute angular orientation and timing indicators with respect to orientation, tracking and focus. The sub-periods can also be used as inputs for calibration purposes.

Figure 8:
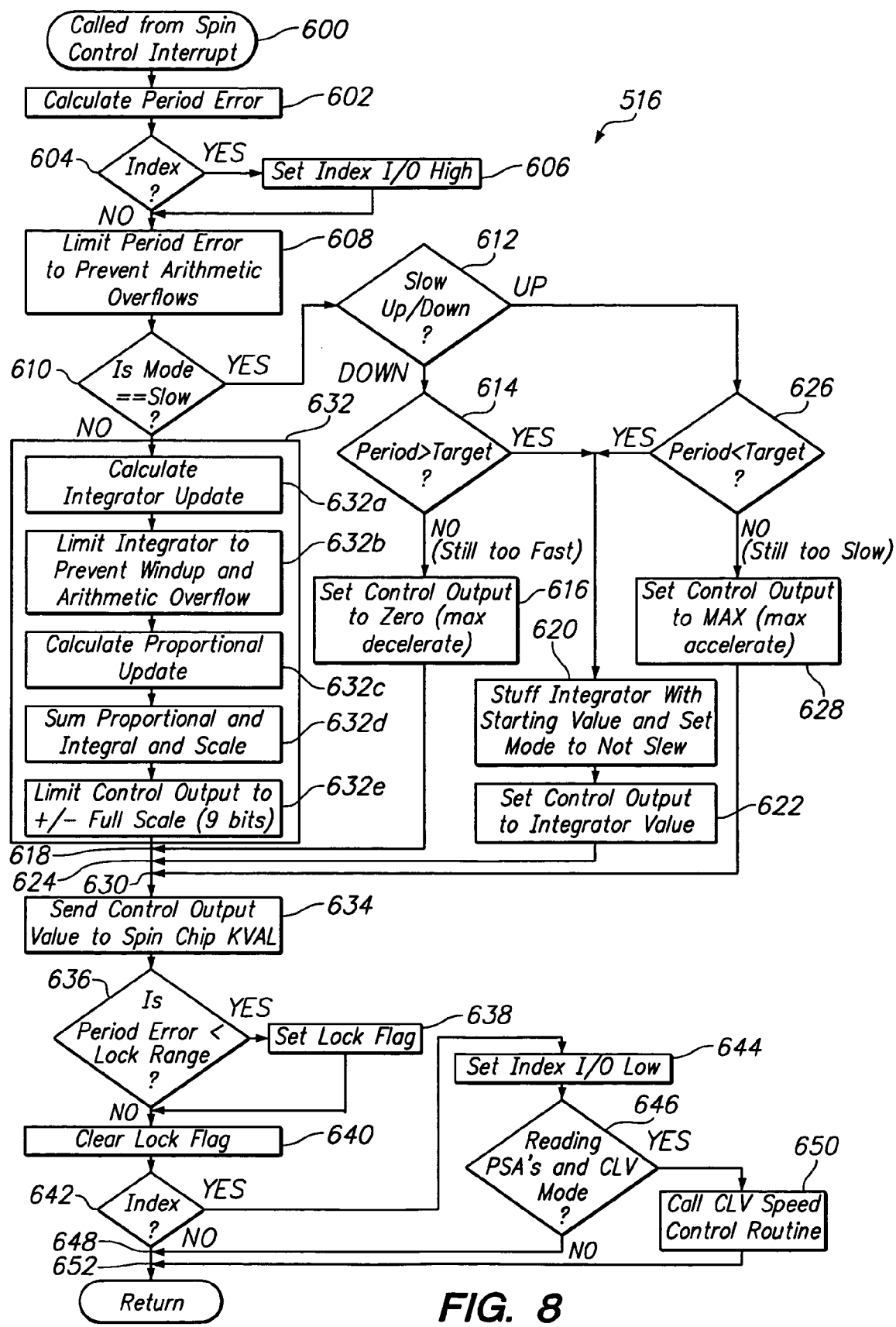
FIG. 8 shows a spin control algorithm which is called from the spin control interrupt algorithm of FIG. 7 according to the present invention.

In action 516, a speed control module is initiated as discussed in detail in FIG. 8. Generally, OPU 108 follows a spiral and moves inward one track per revolution.

Accordingly, in action 518, a "jump-back" algorithm can be set which causes a jump-back of one track every revolution to revisit a track. The jump-back algorithm can be used to maintain radial position at a location on optical medium 106 or to re-read a small portion of the data on optical medium 106. Optionally, the jump-back can be set to two tracks every two revolutions or, for example, N tracks every N revolutions. Thus, a timer or index is set, which is incrementally maintained for every one revolution of the motor to keep a count of the number of revolutions to determine whether it is time to do another jump-back. The Jump-Back is synchronized with the rotation rate by the BEMF interrupt.

Optionally, a diagnostic tracing can be enabled in action 520. Diagnostic testing can be used in development and manufacturing, to understand the performance of spin control servo system 300. For example, every time that the BEMF interrupt occurs, data can be collected which characterizes the performance of spin control servo system 300, such as the measured spin period, target spin period, and output of controller 308. In addition, diagnostic tracing can be used to monitor the acceleration and deceleration of spin motor 102 when the target spin period is changed. For example, if diagnostic tracing is enabled, logic is provided which records the variables as they are at the time of the BEMF interrupt. The variables can be stored in an array to be downloaded into a diagnostic system.

In action 522, a Flag can be set the first time the BEMF interrupt occurs. If the Flag is set the routine enters into the normal speed control mode (Action 524). Accordingly, the first time through the routine determines that the startup has been completed and that an interrupt has been received.

In action 526, the routine returns to start module 400 (FIG. 6). As previously mentioned, at the end of the startup routine, the BEMF is enabled and the routine waits for a time out signal. If the BEMF interrupt occurs within a reasonable period of time, variables are created, which allow other firmware state machines to monitor the spin function and initiate error recovery, if necessary. (i.e., the Watchdog function).

FIG. 8 shows a spin speed control module, which can be called from spin control interrupt module 420 in action 516 (referred to hereinafter as "spin speed module 516") of FIG. 7 according to the present invention. In one embodiment, spin speed module 516 can be called six times per revolution to perform the actual speed control.

In action 600, spin speed module 516 is called once per BEMF interrupt. In action 602, the measured period is compared to a reference period to determine the difference between the two periods and generate a period error.

In action 604, an index checker determines whether or not the period is an index period as calculated in action 512 of FIG. 7. The Index Period is the period measured when the index counter gets to the index count (for example, every 6 interrupts-one per revolution).

In action 604, if the period is an Index Period, an index is set to I/O high (Action 606), otherwise spin speed module 516 continues. This I/O is used to trigger a scope once per revolution of spin motor 102 for diagnostic purposes.

In action 608, in one embodiment, spin speed module 516 limits the size of the period error calculated in action 602. The error is limited to ensure that the system processor, whether a 16 bit, 32 bit or higher bit processor, does not overflow the arithmetic operations. The error is limited by comparing the period error to a Minimum/Maximum limit. If the period error is larger than the Maximum, the period error is set to the maximum limit. If the period error is smaller than the Minimum, the period error is set to the minimum limit. A reason to limit the period error is to prevent the math from overflowing.

Spin speed module 516, initiates slew mode, which can be used to quickly change the velocity of spindle motor 102 during, for example, during start-up operation, seeking operations or when optical drive 100 experiences a shock, which causes optical drive 100 to be knocked off track. The slew mode is set to accelerate or decelerate spin motor 102 to a relatively high or low speed. Slew mode does not require intermediate speed control, since the target speed is based on where the speed is going to end up after spin motor 102 is spun-up for a given PSA number. Instead, slew mode uses a full on or full off control. Slew mode can be optimized to accomplish the speed change quickly with minimum over/undershoot.

In action 610, a decision is made as whether slew mode is active. Slew mode is made active when it is determined that a new speed is required that is more than 100 RPM higher or lower than the present speed. Action 610 checks the slew mode flag to determine if slew mode is active. If slew mode is active, another decision must be made, in action 612, as to whether acceleration or deceleration is desired. In one embodiment, to decelerate a checker first determines if the period is less than the target period (action 614). If it is not, then the speed is too fast. In action 616, the speed controller output is set to zero to provide a maximum deceleration. The routine exits slew mode and continues at 618.

Again referring to the deceleration embodiment, in action 614, when the period is greater than the target period, the desired speed is presumed to have been achieved. The next time an interrupt is received, the routine will not enter into slew mode.

In action 620, the integrator function is initialized with the starting value that has been determined to minimize the transient and a non-slew mode is set. Accordingly, when the next interrupt occurs, the routine will not enter slew mode at 610.

In action 622, the control output is set with the value received from the Integrator rather than a zero as when in slew mode. The routine exits slew mode and continues at 624.

Referring again to action 612, if acceleration is desired a determination is made at action 626 whether the period is less than the target period.(i.e., the speed required either at the end of a seek or for initial spin-up). If the period is not less then the target period then the velocity is too low. In action 628, the control output is set to maximum acceleration. The routine exits slew mode and continues at 630.

In action 626, if the period is less then the target period, the integrator function is initialized with the starting value that has been determined to minimize the transient and the mode is set to not slew (action 620). Accordingly, when the next interrupt occurs, the routine will not enter slew mode at 610.

In action 622, the control output is set with the value received from the integrator function rather than a zero as before during slew mode. The routine exits slew mode and continues at 624.

Referring again to action 610, if slew mode is not selected then the routine enters a control package (action 632), which includes the actions used to control velocity in the CLV mode. In action 632a the integrator function is updated to a current integrator function value. The current integrator function value is equal to the sum of the old integrator function value and the integrator gain Ki (FIG. 5) multiplied by the period error. The integrator gain Ki is based on the target period.

In action 632b the integrator function value is limited to +/− a maximum rate to prevent later arithmetic overflows. The limiting algorithm compares the integrator value to +and − a constant. If the integrator function value is greater than +Maximum then the function value is set to the Maximum. If the integrator function value is less then −Maximum then the value is set to the −Maximum. The maximum is large enough to allow the integrator function to generate a large control effort and keep the integrator value small enough to prevent arithmetic overflows. The integrator function value is limited to full scale control output to prevent the integrator from wind-up and arithmetic overflow.

In action 632c the proportional term is calculated. The proportional term is the proportional gain Kp (FIG. 5) multiplied by the period error. In action 632d, the sum of the Ki and Kp terms may be divided by a factor, if necessary, to correct for units.

In action 632e, drive module 253 can command the voltage. In one embodiment, the output of drive module 253 is limited to a 9 bit control register to ensure that no more than full scale is output.

Once through speed control package 632, the speed control is complete. In action 636, a checker decides whether or not the velocity of spin motor 102 is in an acceptable range to the target speed to set the lock flag. The checker ensures that the period error is greater than some value and less than some other value. The value to be checked can be a function of the target spin period. In one embodiment, the current lock range is a value approximately 2% of the target spin period. In action 638, if the period is less than the lock range value the lock flag is set, or else, in action 640, if the period is greater than the lock range value, the lock flag is cleared.

In action 642, a check is provided to indicate if the system is in an index state. As previously mentioned, the Index is set after a number of interrupts are received. For example, the Index can be incremented after every revolution (i.e, after receiving six BEMF interrupts). If the system is not in an index state, the routine can continue without entering into CLV mode.

In action 644, the system is in an index state, and the I/O that had been set high in action 606 is turned off or set to low. This creates a short pulse going out through an I/O line every time index occurs (e.g., every six BEMF interrupts).

In action 646, a checker determines if PSAs are being read to determine if the CLV routine is necessary. During spin up and during seek, the system cannot read PSAs. Thus, in action 646, if PSAs are not being read, the routine returns to 648 and continues. In action 646, if PSAs are being read, the routine enters action 650 to update the CLV target as described with reference to FIG. 9. Once the CLV target is updated the routine returns to point 652 and continues.

Figure 9:
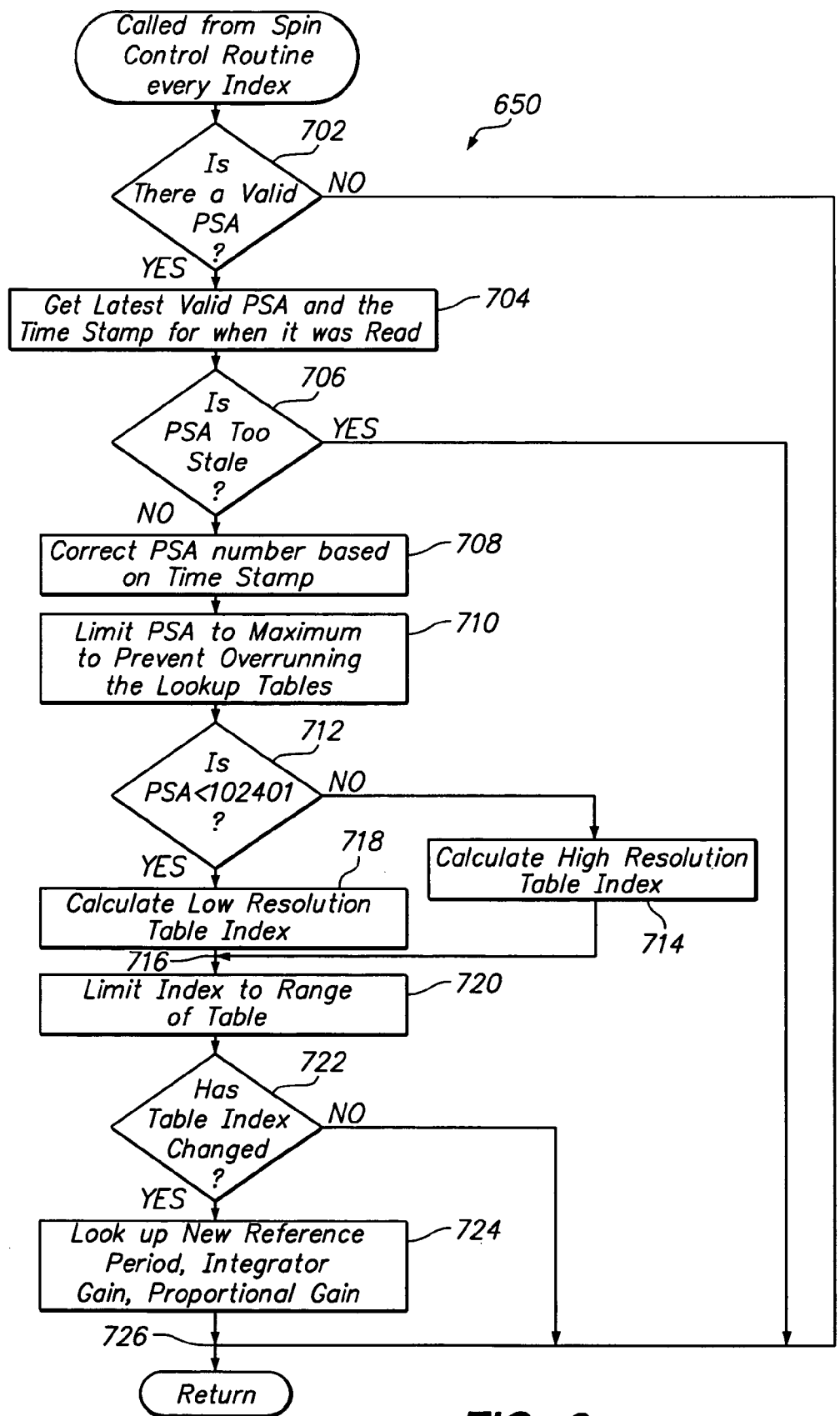
FIG. 9 shows an embodiment of a spin speed control algorithm called from the spin control algorithm of FIG. 8 according to the present invention.

FIG. 9 shows an embodiment of a spin speed control module 650 called from spin speed module 516 of FIG. 8 according to the present invention. Spin speed control module 650, called once per revolution (i.e. when in an index state), adjusts the spin speed as optical medium 106 is spiraling along, such that the CLV is maintained if a valid PSA is received from optical medium 106. When a valid PSA is read from optical medium 106, an interrupt occurs that processes the PSA and sets flags to indicate whether or not a valid PSA exists for a reasonable period value. The PSA valid flag is reset to zero whenever the system is not tracking. Accordingly, if the system has performed, for example, a seek, the last PSA read is considered erroneous, since the PSA does not pertain to the current location anymore.

In action 702, if no valid PSA has been received since the system started tracking the speed control algorithm bypasses the remainder of the routine and continues at 726. If tracking is closed and the system is reading PSAs, then the valid flag is set and a time stamp is recorded, which allows speed control module 650 to determine the age of the PSA. In action 704, since PSAs can occur every two milliseconds, speed control module 650 can update the PSA number if necessary (i.e., the PSA number is old) and the time of the reading is known.

In action 706, a check is made to determine the age of the PSA number. The checker compares the current time stamp to the old time stamp, if more than a specific check time has elapsed, for example, more than 48 milliseconds, it is assumed that the PSA is no longer valid. The remainder of speed control module 650 is bypassed and the routine continues at 726.

In action 706, if the elapsed time is less than the specific check time, for example less than 48 milliseconds, the PSA number can be updated. In action 708, the PSA number is incremented by one for every two milliseconds of elapsed time since the last reading.

In action 710, the PSA maximum is limited to prevent overrun of lookup tables module 306 (FIG. 5). PSA number velocity versus PSA number, is not necessarily a linear function, since it is equal to 1 over radius function. in one embodiment, the PSA is compared to a constant known to be the largest valid PSA. If the PSA is larger than this maximum valid PSA then it is set to this maximum before the table lookup occurs.

As OPU 108 spirals in from the OD to the ID, which takes it to higher PSA numbers, the incremental speed difference per revolution becomes greater. In one embodiment, lookup table module 306 (FIG. 5) is divided into two sections. The first section provides PSA numbers that correspond to positions on the outer radius. These positions can have lower resolution, since they do not change quickly relative to positions on the inner radius. The second section provides PSA numbers that correspond to positions on the inner radius. The positions on the inner radius change much quicker than positions on the outer radius and therefore the resolution is higher. The two section lookup table module 306 conserves table space and keeps the maximum linear velocity error small.

In action 712, the PSA is compared to a reference number. The reference number is determined to correspond to the largest PSA in the low resolution table. For example, the reference number can be any constant, for example, 10240. If the PSA is greater than the reference number, the routine continues to action 714 where the second section or high resolution look up table is used. In action 712, if the PSA is lower than the reference number, then the first section or lower resolution look up table is used. The lookup table, thus provides the target period for spin motor 102 at a given PSA and the controller gain coefficients that are desired for stable speed control at the given radius, for example, Ki and Kp.

As mentioned above, the Table Index is a number corresponding to a row in lookup table 306. In one embodiment, to calculate the Index in the high or low resolution table, the PSA is divided by the number of PSAs per row, which may range up to about 1024. For example, in one embodiment, the low resolution spin period table is indexed by 256 PSAs per row and the high resolution spin period table is indexed by 128 PSAs per row. Similarly, for example, the Ki and Kp tables can be indexed by 1024 and 512 PSAs per row, respectively.

In action 720, the calculated Index is limited to the range of the table to ensure that the table limit is not exceeded for any reason.

In action 722, a check is provided to determine if the index is different than the previous index received during a previous revolution. If the table index has not changed, the routine continues 726. If the table index has changed and the lower resolution table has been used, the PSA number has to change by one count before the table index is updated. If the table index has changed and the higher resolution table has been used, the PSA number has to change by one count before the table index is updated. The index is checked for a change to reduce the firmware computation time, since in most instances the index will not have changed. No table lookup is required if the index has not changed.

In most embodiments, the index will remain the same between revolutions and the routine can continue to 726. However, in action 722, if the index has changed, the routine looks up a new period integrator Ki for a proportional gain Kp and puts it in global variables available to all of the modules to be used in spin control interrupt 420 (FIG. 7) and spin speed module 516 (FIG. 8).

Figure 10:
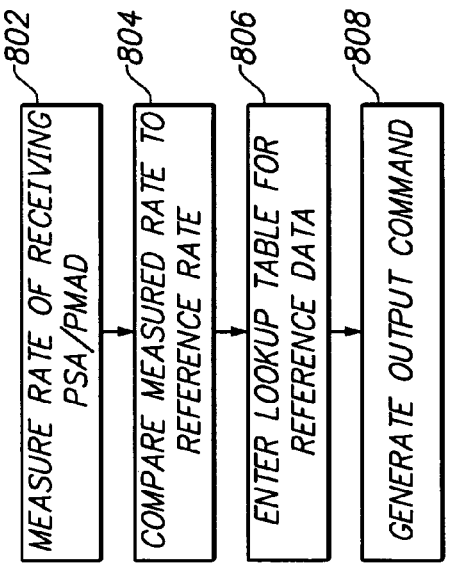
FIG. 10 is a block diagram of a PSA/PMAD feedback system.

FIG. 10 is a block diagram of a PSA/PMAD feedback system 800 in accordance with the present invention. In one embodiment, OPU 108 can travel across optical medium 106 from the OD to the ID or from the ID to the OD with optical medium 106 spinning such that the data directly under OPU 108 travels at a constant linear velocity during read and/or write operations to provide and maintain a constant data rate to R/W data processing 116. In this embodiment, the PSA/PMAD values on optical medium 106 are equally spaced apart along a spiral path. PSA/PMAD feedback system 800 ensures that the constant linear velocity of the data under OPU 108 is maintained by ensuring that the reading of the PSA/PMAD values occur at a substantially constant rate.

In action 802, PSA/PMAD values are read from optical medium 106 and the rate at which the PSA/PMADs are read is measured.

In action 804, the measured rate is compared to a reference rate to provide a rate error. The reference rate can be any desired rate and once selected can be made constant. In one embodiment, the reference rate is about 2 milliseconds.

In action 806, the PSA/PMAD value is used to access a lookup table, similar in form and function to lookup table 306 described above. Reference data is acquired from the lookup table, which may include a proportional gain, and an integrator gain.

In action 808, an integration function is performed using the reference data and the rate error, in a manner similar to that described above, to provide an output command. The output command can be used to provide a drive output, which commands the voltage applied to spin motor 102 to change the spin speed of spin motor 102, as desired.

While particular embodiments of the present invention have been shown and described, it will be obvious to those having ordinary skill in the art that changes and modifications can be made without departing from this invention in its broader aspects. Therefore, the appended claims are to encompass within their scope all such changes and modifications as fall within the scope of this invention.

What is claimed is:

1. A method for controlling the spin speed of motor, said method comprising:
   receiving a physical sector address (PSA) value and recording a current time of receipt;
   determining a time difference between the time of receipt and a previous time of receipt;
   if the time difference is less than a maximum time difference, entering a database using a table index based on said PSA value; and
   providing reference data from said database corresponding to said table index to provide an output for providing a control effort.

2. The method of claim 1, wherein said entering said database comprises entering a first resolution table or a second resolution table based upon said table index.

3. The method of claim 2, wherein said reference data comprises a proportional gain (Kp), an integrator gain (Ki) and a reference period.

4. The method of claim 1, further comprising calculating said table index by dividing the PSA value by a number of PSA data entries listed per row in said database.

5. The method of claim 1, wherein said receiving of said PSA value occurs every 2 milliseconds.

6. The method of claim 5, wherein said receiving comprises detecting an age of said PSA value by comparing the receipt time for a PSA value previously received to a present time.

7. The method of claim 6, comprises updating said PSA value by one for every 2 milliseconds of time passed when said comparison yields a difference of less than about 48 milliseconds.

8. The method of claim 1, wherein said database comprises a lookup table module including a first table section corresponding to PSA values from a first portion of an optical medium and a second table section corresponding to PSA values from a second portion of said optical medium.

9. A method for controlling spin velocity of an optical medium comprising:
   reading a physical sector address (PSA) from an optical medium;
   detecting an age of said PSA by comparing a first time stamp for said PSA to the present time;
   if the age is less than a maximum age, calculating a table index based on said PSA;
   entering a lookup table module to acquire reference data; and
   maintaining a constant data rate transfer from said optical medium for a range of PSAs.

10. The method of claim 9, further comprising updating said PSA by one for every 2 milliseconds of time passed when about 48 milliseconds have passed since said reading of said PSA.

11. The method of claim 9, wherein said reference data comprises a proportional gain (Kp), an integrator gain (Ki) and a reference period.

12. The method of claim 9, wherein said calculating said table index comprises dividing the PSA by a number of PSA data entries listed per row in said lookup table module.

13. The method of claim 9, wherein said reading of said PSA value occurs every 2milliseconds.

14. The method of claim 9, wherein said lookup table module comprises a first table section corresponding to a PSA from a first portion of said optical medium and a second table section corresponding to a PSA from a second portion of said optical medium.

15. A system for controlling spin velocity of an optical medium comprising:
- means for reading a physical sector address (PSA) from an optical medium;
- means for calculating a table index based on said PSA;
- means for detecting an age of said PSA by comparing a time stamp for said PSA to a present time;
- means for entering a lookup table module to acquire reference data; and
- means for maintaining a constant data rate transfer from said optical medium for a range of PSAs.

16. The method of claim 15, wherein said lookup table module comprises a first table section corresponding to a PSA from a first portion of said optical medium and a second table section corresponding to a PSA from a second portion of said optical medium.

17. The system of claim 15, wherein said reference data comprises a proportional gain (Kp), an integrator gain (Ki) and a reference period.

* * * * *